US012782794B2

(12) United States Patent
Liu et al.

(10) Patent No.: US 12,782,794 B2
(45) Date of Patent: Nov. 3, 2026

(54) LIGHT PATH FOLDING ELEMENT, CAMERA MODULE AND ELECTRONIC DEVICE

(71) Applicant: LARGAN PRECISION CO., LTD., Taichung City (TW)

(72) Inventors: Ssu-Hsin Liu, Taichung City (TW); Wei-Che Tung, Taichung City (TW); Lin-An Chang, Taichung City (TW); Ming-Ta Chou, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 0 days.

(21) Appl. No.: 19/408,546

(22) Filed: Dec. 4, 2025

(65) Prior Publication Data

US 2026/0086440 A1 Mar. 26, 2026

Related U.S. Application Data

(63) Continuation of application No. 18/454,995, filed on Aug. 24, 2023, now Pat. No. 12,523,923.

(60) Provisional application No. 63/373,557, filed on Aug. 26, 2022.

(30) Foreign Application Priority Data

Jun. 21, 2023 (TW) ................................ 112123543

(51) Int. Cl.
*G03B 17/17* (2021.01)
*H04N 23/55* (2023.01)

(52) U.S. Cl.
CPC ............ *G03B 17/17* (2013.01); *H04N 23/55* (2023.01)

(58) Field of Classification Search
CPC .... G03B 17/17; H04N 23/55; G02B 13/0065; G02B 5/005; G02B 5/003; G02B 5/04; G02B 27/0018
See application file for complete search history.

(56) References Cited

U.S. PATENT DOCUMENTS

2022/0091373 A1* 3/2022 Saiga ................. G02B 13/0035
2022/0091398 A1* 3/2022 Smyth .................. H04N 23/687
2022/0163706 A1* 5/2022 Feldman ............ G02B 13/0065
2022/0196993 A1* 6/2022 Liao ......................... G02B 5/22

* cited by examiner

*Primary Examiner* — Christopher E Leiby
(74) *Attorney, Agent, or Firm* — McClure, Qualey & Rodack, LLP

(57) ABSTRACT

A light path folding element includes a first surface, a second surface, a first reflecting surface and a second reflecting surface. A light travels from the first surface into the light path folding element. The second surface is disposed relative to the first surface along a first direction and is parallel to the first surface, and the first direction is perpendicular to the first surface. The first reflecting surface connects the first surface and the second surface, an acute angle is formed between the first reflecting surface and the first surface, and the light forms an internal reflection via the first reflecting surface. The light forms another internal reflection via the second reflecting surface. The light path folding element further includes a light blocking structure, which extends from at least one of the first surface and the second surface into the light path folding element.

24 Claims, 23 Drawing Sheets

200

400

420

500

10

30

LIGHT PATH FOLDING ELEMENT, CAMERA MODULE AND ELECTRONIC DEVICE

RELATED APPLICATIONS

This application is a continuation of U.S. application Ser. No. 18/454,995, filed Aug. 24, 2023, which claims priority to Taiwan Application Serial Number 112123543, filed Jun. 21, 2023 and Provisional Application Ser. No. 63/373,557, filed Aug. 26, 2022, which are herein incorporated by reference.

BACKGROUND

Technical Field

The present disclosure relates to a light path folding element and a camera module. More particularly, the present disclosure relates to a light path folding element and a camera module applicable to portable electronic devices.

Description of Related Art

In recent years, portable electronic devices have developed rapidly. For example, intelligent electronic devices and tablets have been filled in the lives of modern people, and camera modules mounted on portable electronic devices have also prospered. However, as technology advances, the quality requirements of the camera modules are becoming higher and higher. Therefore, a camera module which can enhance the image quality, needs to be developed.

SUMMARY

According to one aspect of the present disclosure, a light path folding element includes a first surface, a second surface, a first reflecting surface and a second reflecting surface. A light travels from the first surface into the light path folding element. The second surface is disposed relative to the first surface along a first direction and is parallel to the first surface, and the first direction is perpendicular to the first surface. The first reflecting surface connects the first surface and the second surface, an acute angle is formed between the first reflecting surface and the first surface, and the light forms an internal reflection via the first reflecting surface. The light forms another internal reflection via the second reflecting surface. The light path folding element further includes a first light blocking structure and a second light blocking structure. The first light blocking structure extends from the first surface into the light path folding element, and the second light blocking structure extends from the second surface into the light path folding element. When a spacing distance along the first direction between the first surface and the second surface is H, a central extending depth of the first light blocking structure along the first direction is h1, a central extending depth of the second light blocking structure along the first direction is h2, and a central spacing distance perpendicular to the first direction between the first light blocking structure and the second light blocking structure is Ls, the following condition is satisfied: $0 \leq \tan\theta \leq 0.45$, wherein $\tan\theta = (h1+h2-H)/Ls$.

According to one aspect of the present disclosure, a light path folding element includes a first surface, a second surface, a first reflecting surface and a second reflecting surface. A light travels from the first surface into the light path folding element. The second surface is disposed relative to the first surface along a first direction and is parallel to the first surface, and the first direction is perpendicular to the first surface. The first reflecting surface connects the first surface and the second surface, an acute angle is formed between the first reflecting surface and the first surface, and the light forms an internal reflection via the first reflecting surface. The light forms another internal reflection via the second reflecting surface. The light path folding element further includes a first light blocking structure, a second light blocking structure and a third light blocking structure. The first light blocking structure extends from the first surface into the light path folding element, the second light blocking structure extends from the second surface into the light path folding element, the third light blocking structure is disposed on an edge of the first surface, and the edge is close to the first reflecting surface. When a spacing distance along the first direction between the first surface and the second surface is H, a central extending depth of the first light blocking structure along the first direction is h1, a central extending depth of the second light blocking structure along the first direction is h2, a central spacing distance perpendicular to the first direction between the first light blocking structure and the second light blocking structure is Ls, and a distance along the first direction from a center of the third light blocking structure to the edge of the first surface is D3, the following conditions are satisfied: $-0.2 \leq \tan\theta \leq 0.55$, wherein $\tan\theta = (h1+h2-H)/Ls$; and $0.4\ \text{mm} < D3 < 2.3\ \text{mm}$.

According to one aspect of the present disclosure, a light path folding element includes a first surface, a second surface, a first reflecting surface and a second reflecting surface. A light travels from the first surface into the light path folding element. The second surface is disposed relative to the first surface along a first direction and is parallel to the first surface, and the first direction is perpendicular to the first surface. The first reflecting surface connects the first surface and the second surface, an acute angle is formed between the first reflecting surface and the first surface, and the light forms an internal reflection via the first reflecting surface. The light forms another internal reflection via the second reflecting surface. The light path folding element further includes a light blocking structure, the light blocking structure extends from at least one of the first surface and the second surface into the light path folding element. When a spacing distance along the first direction between the first surface and the second surface is H, and a central extending depth of the light blocking structure along the first direction is h, the following condition is satisfied: $0.45 \leq h/H \leq 0.80$.

According to one aspect of the present disclosure, a camera module includes an imaging lens assembly, an image sensor and the light path folding element of the aforementioned aspect. The imaging lens assembly is disposed relative to the first surface of the light path folding element, and the light path folding element is for folding an imaging light of the imaging lens assembly to the image sensor.

According to one aspect of the present disclosure, an electronic device includes the camera module of the aforementioned aspect.

According to one aspect of the present disclosure, a light path folding element includes a first surface, a second surface, a first reflecting surface and a second reflecting surface. A light travels from the first surface into the light path folding element. The second surface is disposed relative to the first surface along a first direction and is parallel to the first surface, and the first direction is perpendicular to the first surface. The first reflecting surface connects the first surface and the second surface, an acute angle is formed between the first reflecting surface and the first surface, and the light forms an internal reflection via the first reflecting surface. The light forms another internal reflection via the second reflecting surface. The light path folding element further includes a light blocking structure, the light blocking structure extends from at least one of the first surface and the second surface into the light path folding element. The light blocking structure includes a plurality of convex portions, and the convex portions are disposed towards an inside of the light path folding element. When a height of each of the convex portions is T, and a width of each of the convex portions is W, the following condition is satisfied: $0.1<T/W<3.5$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
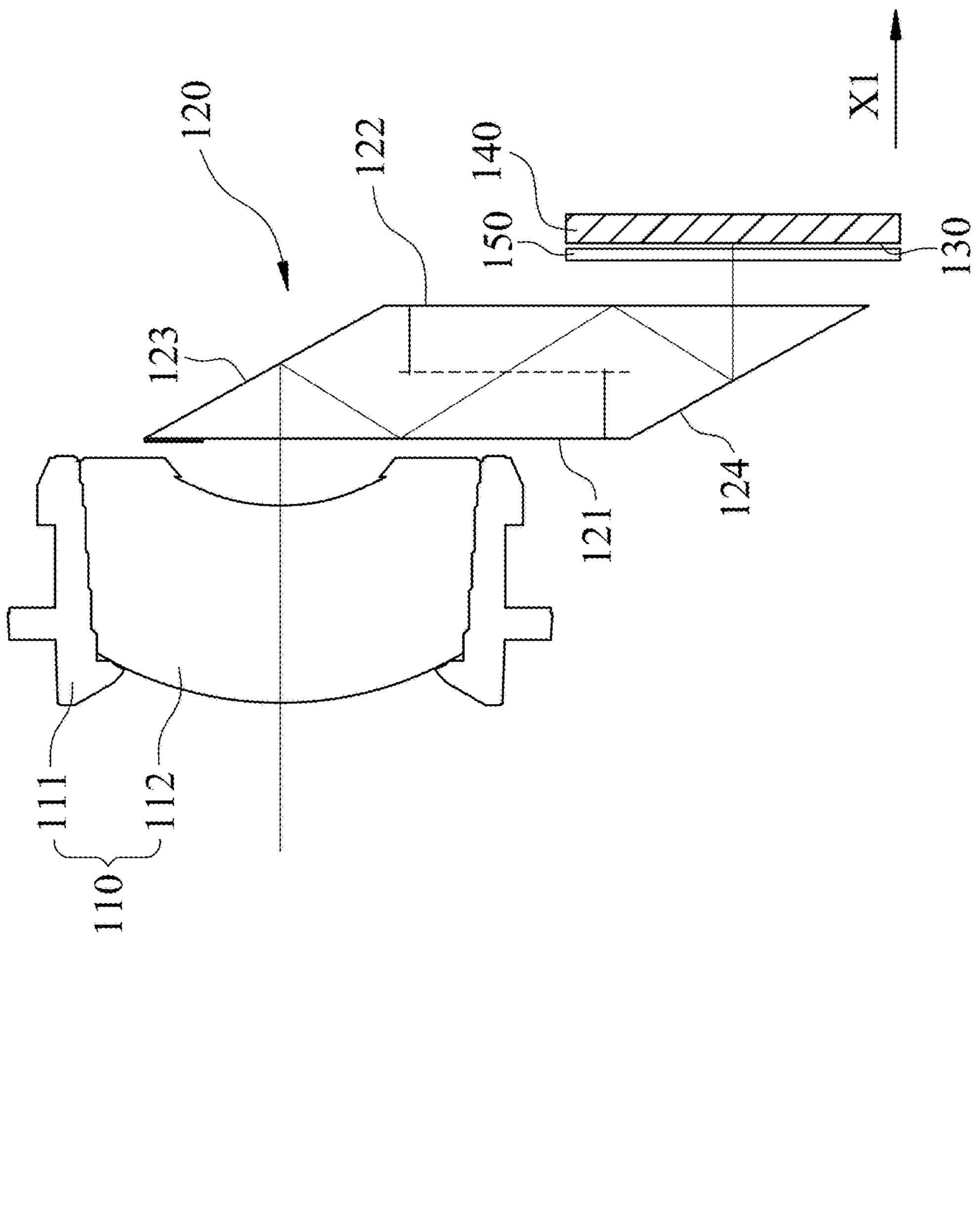
FIG. 1A is a schematic view of a camera module according to the 1st embodiment of the present disclosure.

The present disclosure provides a light path folding element, which includes a first surface, a second surface, a first reflecting surface and a second reflecting surface. A light travels from the first surface into the light path folding element. The second surface is disposed relative to the first surface along a first direction and is parallel to the first surface, and the first direction is perpendicular to the first surface. The first reflecting surface connects the first surface and the second surface, an acute angle is formed between the first reflecting surface and the first surface, and the light forms an internal reflection via the first reflecting surface. The light forms another internal reflection via the second reflecting surface. The light path folding element further includes a first light blocking structure and a second light blocking structure, the first light blocking structure extends from the first surface into the light path folding element, and the second light blocking structure extends from the second surface into the light path folding element. When a spacing distance along the first direction between the first surface and the second surface is H, a central extending depth of the first light blocking structure along the first direction is h1, a central extending depth of the second light blocking structure along the first direction is h2, and a central spacing distance perpendicular to the first direction between the first light blocking structure and the second light blocking structure is Ls, the following condition is satisfied: $0\leq\tan\theta\leq0.45$, wherein $\tan\theta=(h1+h2-H)/Ls$. Therefore, the light path folding element of the present disclosure can form a plurality of internal reflections, and transmit the light along the specific path by arranging the first light blocking structure and the second light blocking structure. Further, when the foregoing condition is satisfied, the inside of the light path folding element can provide a larger range for light blocking, which is favorable for efficiently blocking stray light from specific angle, and the foregoing structure arrangement is favorable for maintaining the stability of the light path by bidirectional light blocking.

Specifically, the light path folding element can be made of glass material or plastic material. The light travels from the first surface into the light path folding element, and forms the internal reflections on the first reflecting surface and the second reflecting surface. The first reflecting surface and the second reflecting surface can provide reflection and transmission according to different design requirements, so that the light folding effect can be achieved. Each of the first light blocking structure and the second light blocking structure can be light blocking plate, light blocking sheet, light blocking coating, anti-reflection coating, etc., but will not be limited thereto. Moreover, the first light blocking structure extends into the inside of the light path folding element along the direction from the first surface towards the second surface, the second light blocking structure extends into the inside of the light path folding element along the direction from the second surface towards the first surface.

When the spacing distance along the first direction between the first surface and the second surface is H, and the central extending depth of the first light blocking structure along the first direction is h1, the following condition is satisfied: $0.45 \leq h1/H \leq 0.80$. Therefore, it is favorable for enhancing the light blocking efficiency by satisfying the specific depth of light blocking range.

When the spacing distance along the first direction between the first surface and the second surface is H, and the central extending depth of the second light blocking structure along the first direction is h2, the following condition is satisfied: $0.45 \leq h2/H \leq 0.80$. Therefore, it is favorable for enhancing the light blocking efficiency by satisfying the specific depth of light blocking range.

When the acute angle is a, the following condition is satisfied: 10 degrees<$\alpha$<40 degrees. Therefore, it is favorable for minimizing the volume of the light path folding element. Further, the following condition can be satisfied: 15 degrees<$\alpha$<37 degrees. Therefore, the light path inside the light path folding element can be further controlled.

The first reflecting surface and the second reflecting surface are relative to each other along a direction perpendicular to the first direction, and the first reflecting surface and the second reflecting surface are parallel to each other. Therefore, the manufacturing precision of the light path folding element can be increased.

The first light blocking structure and the second light blocking structure are shrunk from the first surface and the second surface into the light path folding element along the first direction, respectively. Therefore, the feasibility of mass production can be provided.

When a refractive index of the light path folding element is N, the following condition is satisfied: $1.45<N<2.1$. Therefore, the stability of the internal reflection can be enhanced.

The light path folding element can further include a third light blocking structure, which is disposed on an edge of the first surface, the edge is close to the first reflecting surface. Therefore, the amount of incident light of the light path folding element can be controlled.

When a distance along the first direction from a center of the third light blocking structure to the edge of the first surface is D3, the following condition is satisfied: 0.4 mm<D3<2.3 mm. Therefore, it is favorable for avoiding the incident light with wide angle travelling into the light path folding element from the first surface.

At least one of the first light blocking structure and the second light blocking structure includes a plurality of convex portions, and the convex portions are disposed towards an inside of the light path folding element. Therefore, the probability of non-imaging light can be effectively reduced.

The present disclosure provides a light path folding element, which includes a first surface, a second surface, a first reflecting surface and a second reflecting surface. A light travels from the first surface into the light path folding element. The second surface is disposed relative to the first surface along a first direction and is parallel to the first surface, and the first direction is perpendicular to the first surface. The first reflecting surface connects the first surface and the second surface, an acute angle is formed between the first reflecting surface and the first surface, and the light forms an internal reflection via the first reflecting surface. The light forms another internal reflection via the second reflecting surface. The light path folding element further includes a first light blocking structure, a second light blocking structure and a third light blocking structure, the first light blocking structure extends from the first surface into the light path folding element, the second light blocking structure extends from the second surface into the light path folding element, the third light blocking structure is disposed on an edge of the first surface, and the edge is close to the first reflecting surface. When a spacing distance along the first direction between the first surface and the second surface is H, a central extending depth of the first light blocking structure along the first direction is h1, a central extending depth of the second light blocking structure along the first direction is h2, a central spacing distance perpendicular to the first direction between the first light blocking structure and the second light blocking structure is Ls, and a distance along the first direction from a center of the third light blocking structure to the edge of the first surface is D3, the following conditions are satisfied: $-0.2 \leq \tan\theta \leq 0.55$, wherein $\tan\theta=(h1+h2-H)/Ls$; and 0.4 mm<D3<2.3 mm. Therefore, the light path folding element of the present disclosure can form a plurality of internal reflections, and transmit the light along the specific path by arranging the light blocking structures. Further, when the foregoing conditions are satisfied, it is favorable for avoiding the incident light with wide angle travelling into the light path folding element from the first surface, and the inside of the light path folding element can provide a larger range for light blocking, which is favorable for efficiently blocking stray light from specific angle, and the foregoing structure arrangement is favorable for maintaining the stability of the light path by bidirectional light blocking.

When the spacing distance along the first direction between the first surface and the second surface is H, and the central extending depth of the first light blocking structure along the first direction is h1, the following condition is satisfied: $0.45 \leq h1/H \leq 0.80$. Therefore, it is favorable for enhancing the light blocking efficiency by satisfying the specific depth of light blocking range.

When the spacing distance along the first direction between the first surface and the second surface is H, and the central extending depth of the second light blocking structure along the first direction is h2, the following condition is satisfied: $0.45 \leq h2/H \leq 0.80$. Therefore, it is favorable for enhancing the light blocking efficiency by satisfying the specific depth of light blocking range.

When the distance along the first direction from a center of the third light blocking structure to the edge of the first surface is D3, the following condition is satisfied: 0.6 mm<D3<2.1 mm. Therefore, it is favorable for enhancing the image quality by further blocking the incident light from the specific angle in the peripheral region. Further, the following condition can be satisfied: 0.9 mm<D3<2.0 mm. Therefore, the optical quality of the product can be maintained, and the manufacturing cost of the product can be reduced.

The first reflecting surface and the second reflecting surface are relative to each other along a direction perpendicular to the first direction, and the first reflecting surface and the second reflecting surface are parallel to each other. Therefore, the manufacturing precision of the light path folding element can be increased.

The first light blocking structure and the second light blocking structure are shrunk from the first surface and the second surface into the light path folding element along the first direction, respectively. Therefore, the feasibility of mass production can be provided.

When a refractive index of the light path folding element is N, the following condition is satisfied: 1.45<N<2.1. Therefore, the stability of the internal reflection can be enhanced.

At least one of the first light blocking structure and the second light blocking structure includes a plurality of convex portions, and the convex portions are disposed towards an inside of the light path folding element. Therefore, the probability of non-imaging light can be effectively reduced.

The present disclosure provides a light path folding element, which includes a first surface, a second surface, a first reflecting surface and a second reflecting surface. A light travels from the first surface into the light path folding element. The second surface is disposed relative to the first surface along a first direction and is parallel to the first surface, and the first direction is perpendicular to the first surface. The first reflecting surface connects the first surface and the second surface, an acute angle is formed between the first reflecting surface and the first surface, and the light forms an internal reflection via the first reflecting surface. The light forms another internal reflection via the second reflecting surface. The light path folding element further includes a light blocking structure, the light blocking structure extends from at least one of the first surface and the second surface into the light path folding element. When a spacing distance along the first direction between the first surface and the second surface is H, and a central extending depth of the light blocking structure along the first direction is h, the following condition is satisfied: 0.45≤h/H≤0.80. Therefore, the light path folding element of the present disclosure can form a plurality of internal reflections, and transmit the light along the specific path by arranging the light blocking structures. Further, when the foregoing condition is satisfied, the inside of the light path folding element can provide a larger range for light blocking, which is favorable for efficiently blocking stray light from specific angle, and the manufacturability of the light path folding element can be provided.

Further, the following condition can be satisfied: 0.49≤h/H≤0.80. Therefore, it is favorable for further enhancing the image quality by providing larger range for light blocking. Further, the following condition can be satisfied: 0.53≤h/H≤0.78. Therefore, it is favorable for maintaining the size precision of the light blocking structure and providing high manufacturing efficiency. Further, the following condition can be satisfied: 0.57≤h/H≤0.75. Therefore, the completeness of the light blocking structure can be maintained.

The acute angle is a, and the following condition is satisfied: 10 degrees<α<40 degrees. Therefore, it is favorable for minimizing the volume of the light path folding element. Further, the following condition can be satisfied: 15 degrees<α<37 degrees. Therefore, the light path inside the light path folding element can be further controlled.

When a refractive index of the light path folding element is N, the following condition is satisfied: 1.45<N<2.1. Therefore, the stability of the internal reflection can be enhanced.

The light blocking structure can include a plurality of convex portions, and the convex portions are disposed towards an inside of the light path folding element. Therefore, the probability of non-imaging light can be effectively reduced.

The light blocking structure is shrunk from at least one of the first surface and the second surface into the light path folding element along the first direction. Therefore, the feasibility of mass production can be provided.

The present disclosure provides a light path folding element, which includes a first surface, a second surface, a first reflecting surface and a second reflecting surface. A light travels from the first surface into the light path folding element. The second surface is disposed relative to the first surface along a first direction and is parallel to the first surface, and the first direction is perpendicular to the first surface. The first reflecting surface connects the first surface and the second surface, an acute angle is formed between the first reflecting surface and the first surface, and the light forms an internal reflection via the first reflecting surface. The light forms another internal reflection via the second reflecting surface. The light path folding element further includes a light blocking structure, the light blocking structure extends from at least one of the first surface and the second surface into the light path folding element. The light blocking structure includes a plurality of convex portions, and the convex portions are disposed towards an inside of the light path folding element. When a height of each of the convex portions is T, and a width of each of the convex portions is W, the following condition is satisfied: 0.1<T/W<3.5. Therefore, it is favorable for effectively reducing the probability of non-imaging light, and providing the manufacturability of the light blocking structure.

When a spacing distance along the first direction between the first surface and the second surface is H, and a central extending depth of the light blocking structure along the first direction is h, the following condition is satisfied: 0.45≤h/H≤0.80. Therefore, it is favorable for enhancing the light blocking efficiency by satisfying the specific depth of light blocking range.

When a refractive index of the light path folding element is N, the following condition is satisfied: 1.45<N<2.1. Therefore, the stability of the internal reflection can be enhanced.

When the acute angle is a, the following condition is satisfied: 10 degrees<α<40 degrees. Therefore, it is favorable for minimizing the volume of the light path folding element. Further, the following condition can be satisfied: 15 degrees<α<37 degrees. Therefore, the light path inside the light path folding element can be further controlled.

When the height of each of the convex portions is T, and the width of each of the convex portions is W, the following condition is satisfied: 0.2<T/W<2.2. Therefore, it is favorable for effectively reducing the probability of non-imaging light, and increasing the manufacturing efficiency. Further, the following condition can be satisfied: 0.25<T/W<1.05.

The present disclosure provides a camera module, which includes an imaging lens assembly, an image sensor and the aforementioned light path folding element. The imaging lens assembly is disposed relative to the first surface of the light path folding element, and the light path folding element is for folding an imaging light of the imaging lens assembly to the image sensor.

The present disclosure provides an electronic device, which includes the aforementioned camera module.

1st Embodiment

FIG. 1A is a schematic view of a camera module 100 according to the 1st embodiment of the present disclosure. In FIG. 1A, the camera module 100 includes an imaging lens assembly 110, an image sensor 140 and a light path folding element 120. The image sensor 140 is disposed on an image surface 130 of the imaging lens assembly 110, the light path folding element 120 is disposed on an image side of the imaging lens assembly 110 and disposed between the imaging lens assembly 110 and the image sensor 140. The imaging lens assembly 110 is disposed relative to a first surface 121 of the light path folding element 120, and the light path folding element 120 is for folding an imaging light of the imaging lens assembly 110 to the image sensor 140. The imaging lens assembly 110 can include a lens barrel 111 and at least one optical element 112, wherein the optical element 112 is disposed in the lens barrel 111, and the optical element 112 can be lens elements, light blocking elements, retainers, etc., and the details will not be described herein. Further, in FIG. 1A, the camera module 100 can further include a filter 150, which is disposed between the light path folding element 120 and the image surface 130, and the present disclosure will not be limited thereto.

Figure 1B:
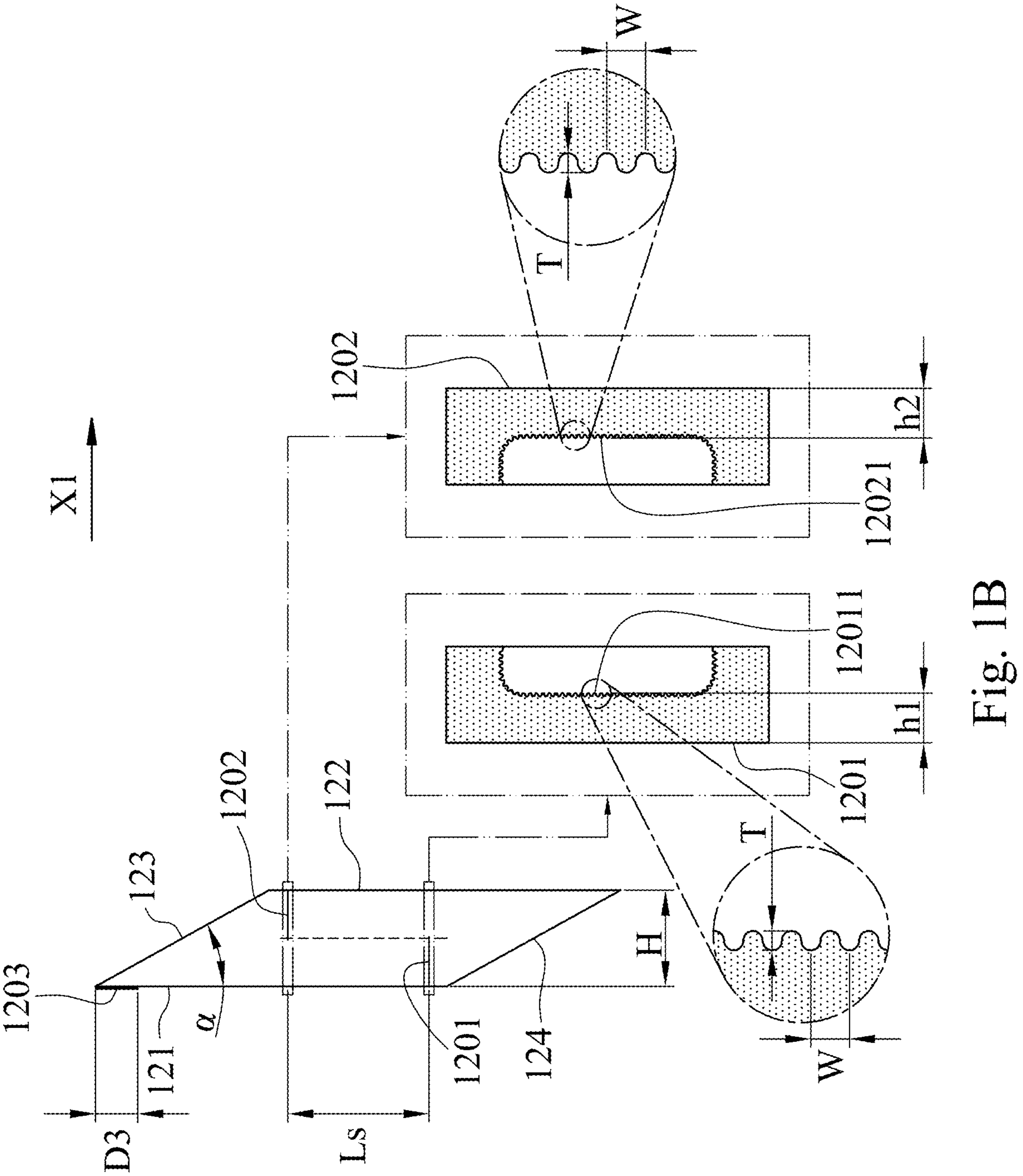
FIG. 1B is a schematic view of a first light blocking structure and a second light blocking structure of the light path folding element according to the 1st embodiment of FIG. 1A.
Figure 1C:
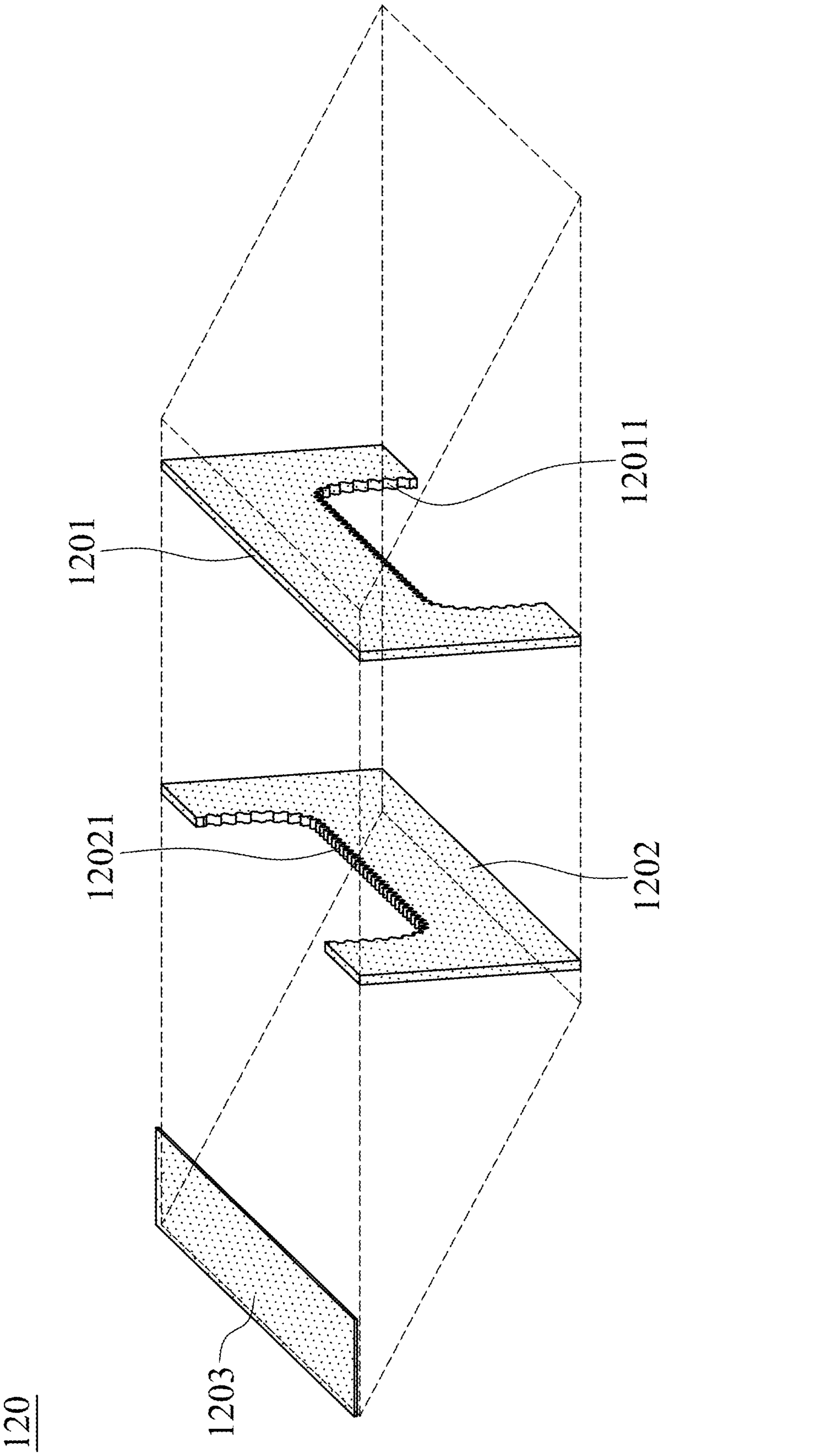
FIG. 1C is a three-dimensional schematic view of the light path folding element according to the 1st embodiment of FIG. 1A.

FIG. 1B is a schematic view of a first light blocking structure 1201 and a second light blocking structure 1202 of the light path folding element 120 according to the 1st embodiment of FIG. 1A. FIG. 1C is a three-dimensional schematic view of the light path folding element 120 according to the 1st embodiment of FIG. 1A. In FIG. 1A, FIG. 1B and FIG. 1C, the light path folding element 120 includes the first surface 121, a second surface 122, a first reflecting surface 123 and a second reflecting surface 124. A light travels from the first surface 121 into the light path folding element 120. The second surface 122 is disposed relative to the first surface 121 along a first direction X1 and is parallel to the first surface 121, and the first direction X1 is perpendicular to the first surface 121. The first reflecting surface 123 connects the first surface 121 and the second surface 122, an acute angle is formed between the first reflecting surface 123 and the first surface 121, and the light forms an internal reflection via the first reflecting surface 123. The light forms another internal reflection via the second reflecting surface 124. Therefore, the imaging light can travel into the image sensor 140. Specifically, the first reflecting surface 123 and the second reflecting surface 124 are relative to each other along a direction perpendicular to the first direction X1, and the first reflecting surface 123 and the second reflecting surface 124 are parallel to each other. When a refractive index of the light path folding element 120 is N, the following condition is satisfied: 1.45<N<2.1. According to the 1st embodiment, the refractive index of the light path folding element 120 is 1.52, but the present disclosure will not be limited thereto.

The light path folding element 120 includes two light blocking structures, which are the first light blocking structure 1201 and the second light blocking structure 1202. The first light blocking structure 1201 extends from the first surface 121 into the light path folding element 120, and the second light blocking structure 1202 extends from the second surface 122 into the light path folding element 120; that is, the first light blocking structure 1201 extends into the inside of the light path folding element 120 along the direction from the first surface 121 towards the second surface 122, the second light blocking structure 1202 extends into the inside of the light path folding element 120 along the direction from the second surface 122 towards the first surface 121. According to the 1st embodiment, each of the first light blocking structure 1201 and the second light blocking structure 1202 is a light blocking plate embedded inside the light path folding element 120, but the present disclosure will not be limited thereto.

Each of the first light blocking structure 1201 and the second light blocking structure 1202 includes a plurality of convex portions 12011, 12021, and the convex portions 12011, 12021 are disposed towards the inside of the light path folding element 120. In detail, Each of the first light blocking structure 1201 and the second light blocking structure 1202 has a thickness, which is concave shape relative to two ends thereof, and the convex portions 12011, 12021 are disposed on the surface of the concave shape, and face towards the inside of the light path folding element 120.

Moreover, the light path folding element 120 can further include a third light blocking structure 1203. The third light blocking structure 1203 is disposed on an edge of the first surface 121, the edge is close to the first reflecting surface 123. According to the 1st embodiment, the third light blocking structure 1203 is a light blocking sheet, which is disposed on the edge of the first surface 121 close to the first reflecting surface 123.

In FIG. 1B, according to the 1st embodiment, a spacing distance along the first direction X1 between the first surface 121 and the second surface 122 is H, a central extending depth of the first light blocking structure 1201 along the first direction X1 is h1, a central extending depth of the second light blocking structure 1202 along the first direction X1 is h2, a central spacing distance perpendicular to the first direction X1 between the first light blocking structure 1201 and the second light blocking structure 1202 is Ls, the acute angle is a, a distance along the first direction X1 from a center of the third light blocking structure 1203 to the edge of the first surface 121 is D3, a height of each of the convex portions 12011, 12021 is T, a width of each of the convex portions 12011, 12021 is W, and the data are stated in the following Table 1.

TABLE 1

| 1st embodiment | | | |
|---|---|---|---|
| H (mm) | 2.385 | h1/H | 0.516 |
| h1 (mm) | 1.23 | h2/H | 0.516 |
| h2 (mm) | 1.23 | α (degrees) | 29 |
| Ls (mm) | 3.5 | D3 (mm) | 1.049 |
| tanθ | 0.021 | T (mm) | 0.08 |
| W (mm) | 0.16 | T/W | 0.5 |

In Table 1, $\tan\theta=(h1+h2-H)/Ls$.

2nd Embodiment

Figure 2A:
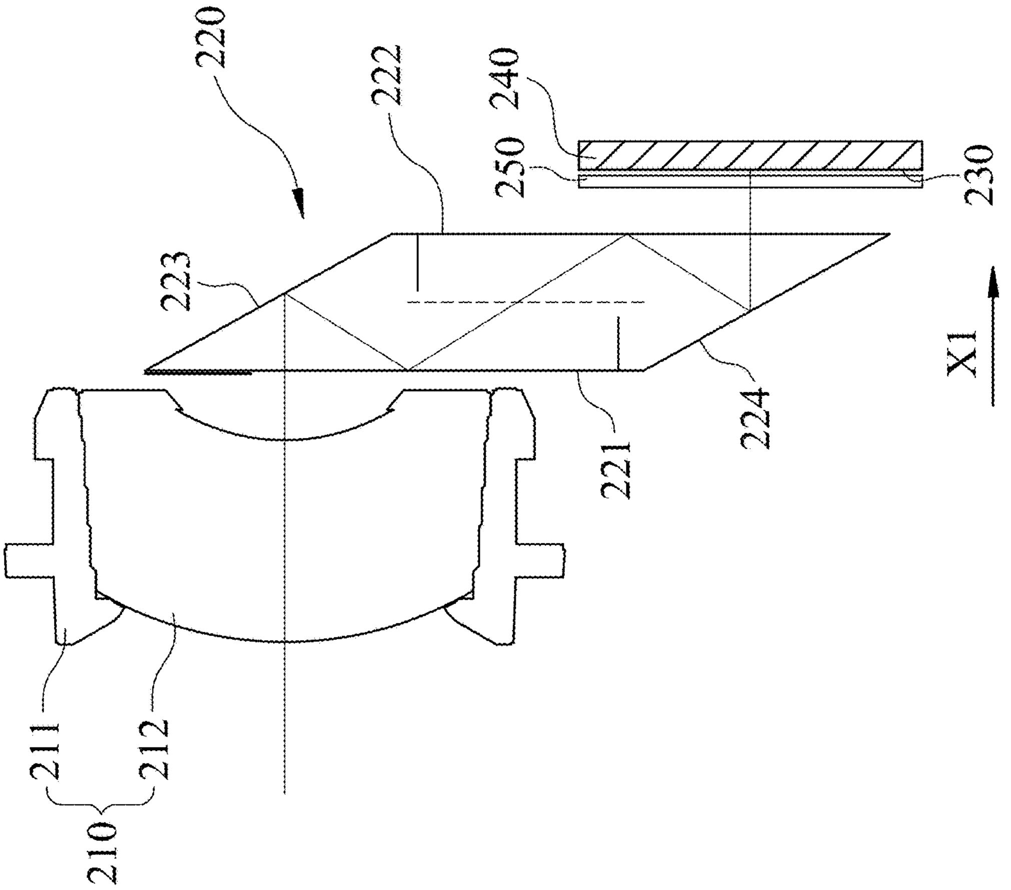
FIG. 2A is a schematic view of a camera module according to the 2nd embodiment of the present disclosure.

FIG. 2A is a schematic view of a camera module 200 according to the 2nd embodiment of the present disclosure. In FIG. 2A, the camera module 200 includes an imaging lens assembly 210, an image sensor 240 and a light path folding element 220. The image sensor 240 is disposed on an image surface 230 of the imaging lens assembly 210, the light path folding element 220 is disposed on an image side of the imaging lens assembly 210 and disposed between the imaging lens assembly 210 and the image sensor 240. The imaging lens assembly 210 is disposed relative to a first surface 221 of the light path folding element 220, and the light path folding element 220 is for folding an imaging light of the imaging lens assembly 210 to the image sensor 240. The imaging lens assembly 210 can include a lens barrel 211 and at least one optical element 212, wherein the optical element 212 is disposed in the lens barrel 211, and the optical element 212 can be lens elements, light blocking elements, retainers, etc., and the details will not be described herein. Further, in FIG. 2A, the camera module 200 can further include a filter 250, which is disposed between the light path folding element 220 and the image surface 230, and the present disclosure will not be limited thereto.

Figure 2B:
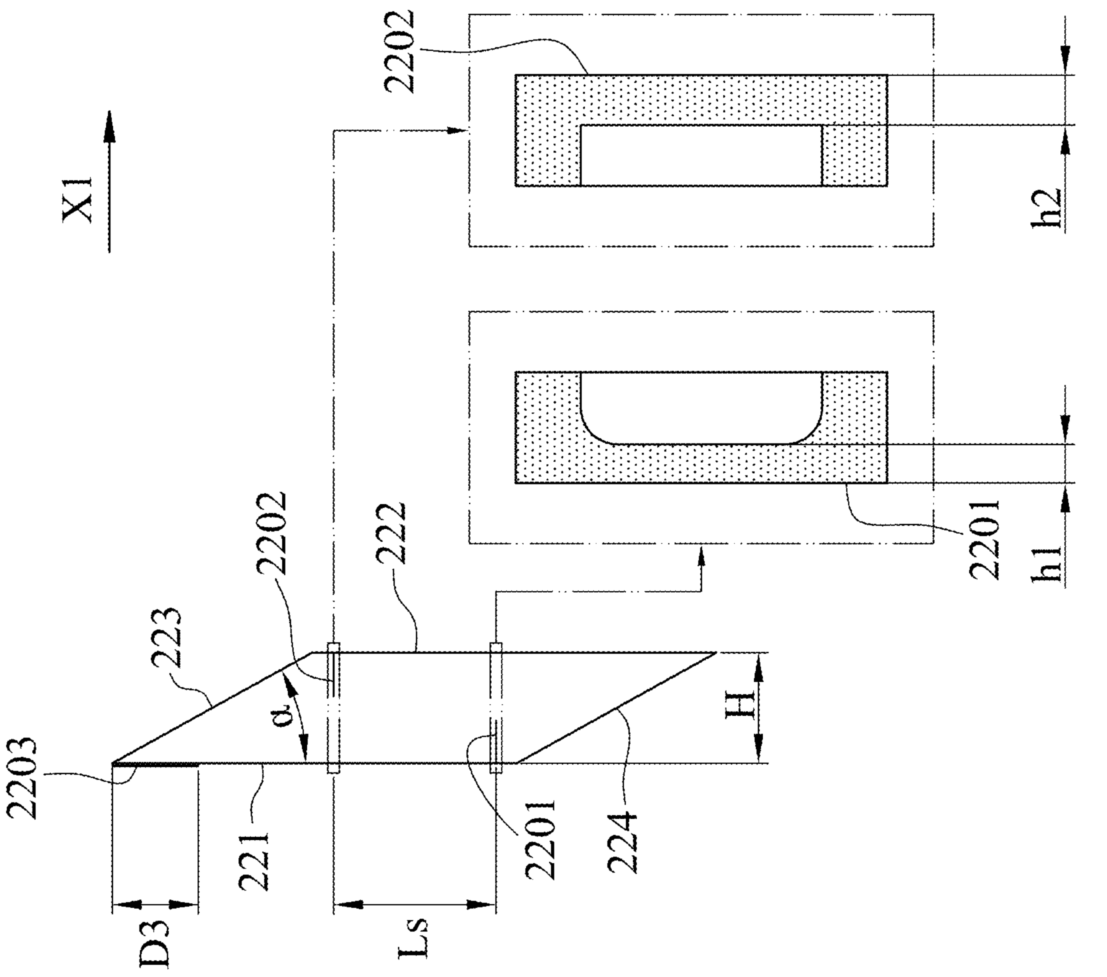
FIG. 2B is a schematic view of a first light blocking structure and a second light blocking structure of the light path folding element according to the 2nd embodiment of FIG. 2A.
Figure 2C:
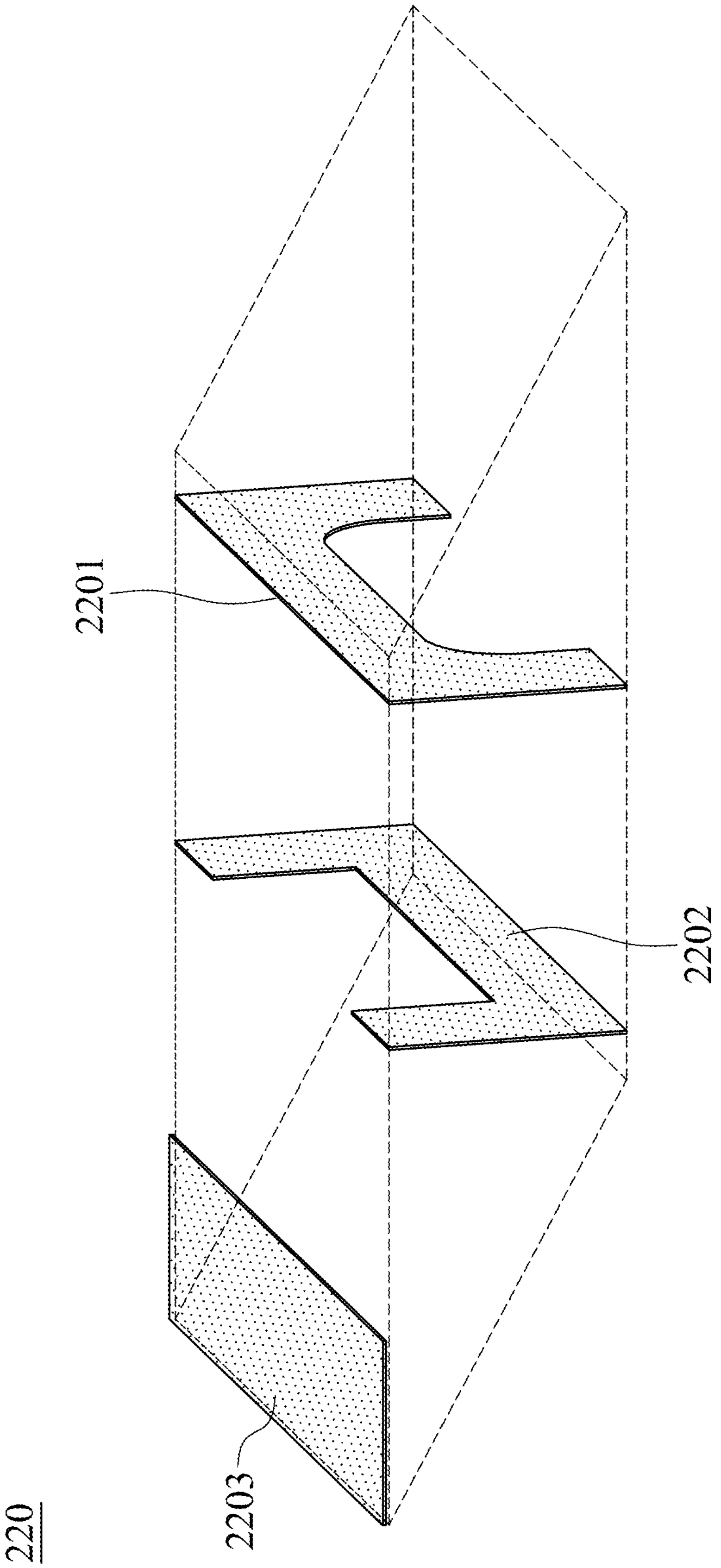
FIG. 2C is a three-dimensional schematic view of the light path folding element according to the 2nd embodiment of FIG. 2A.

FIG. 2B is a schematic view of a first light blocking structure 2201 and a second light blocking structure 2202 of the light path folding element 220 according to the 2nd embodiment of FIG. 2A. FIG. 2C is a three-dimensional schematic view of the light path folding element 220 according to the 2nd embodiment of FIG. 2A. In FIG. 2A, FIG. 2B and FIG. 2C, the light path folding element 220 includes the first surface 221, a second surface 222, a first reflecting surface 223 and a second reflecting surface 224. A light travels from the first surface 221 into the light path folding element 220. The second surface 222 is disposed relative to the first surface 221 along a first direction X1 and is parallel to the first surface 221, and the first direction X1 is perpendicular to the first surface 221. The first reflecting surface 223 connects the first surface 221 and the second surface 222, an acute angle is formed between the first reflecting surface 223 and the first surface 221, and the light forms an internal reflection via the first reflecting surface 223. The light forms another internal reflection via the second reflecting surface 224. Therefore, the imaging light can travel into the image sensor 240. Specifically, the first reflecting surface 223 and the second reflecting surface 224 are relative to each other along a direction perpendicular to the first direction X1, and the first reflecting surface 223 and the second reflecting surface 224 are parallel to each other. When a refractive index of the light path folding element 220 is N, the following condition is satisfied: $1.45<N<2.1$. According to the 2nd embodiment, the refractive index of the light path folding element 220 is 1.78, but the present disclosure will not be limited thereto.

The light path folding element 220 includes two light blocking structures, which are the first light blocking structure 2201 and the second light blocking structure 2202. The first light blocking structure 2201 extends from the first surface 221 into the light path folding element 220, and the second light blocking structure 2202 extends from the second surface 222 into the light path folding element 220; that is, the first light blocking structure 2201 extends into the inside of the light path folding element 220 along the direction from the first surface 221 towards the second surface 222, the second light blocking structure 2202 extends into the inside of the light path folding element 220 along the direction from the second surface 222 towards the first surface 221. According to the 2nd embodiment, each of the first light blocking structure 2201 and the second light blocking structure 2202 is a light blocking plate embedded inside the light path folding element 220, but the present disclosure will not be limited thereto. In detail, each of the first light blocking structure 2201 and the second light blocking structure 2202 is gradually concaved from two ends to the center thereof.

Moreover, the light path folding element 220 can further include a third light blocking structure 2203. The third light blocking structure 2203 is disposed on an edge of the first surface 221, the edge is close to the first reflecting surface 223. According to the 2nd embodiment, the third light blocking structure 2203 is a light blocking sheet, which is disposed on the edge of the first surface 221 close to the first reflecting surface 223.

In FIG. 2B, according to the 2nd embodiment, a spacing distance along the first direction X1 between the first surface 221 and the second surface 222 is H, a central extending depth of the first light blocking structure 2201 along the first direction X1 is h1, a central extending depth of the second light blocking structure 2202 along the first direction X1 is h2, a central spacing distance perpendicular to the first direction X1 between the first light blocking structure 2201 and the second light blocking structure 2202 is Ls, the acute angle is a, a distance along the first direction X1 from a center of the third light blocking structure 2203 to the edge of the first surface 221 is D3, and the data are stated in the following Table 2.

TABLE 2

| 2nd embodiment | | | |
|---|---|---|---|
| H (mm) | 2.385 | h1/H | 0.348 |
| h1 (mm) | 0.83 | h2/H | 0.451 |
| h2 (mm) | 1.075 | α (degrees) | 29 |
| Ls (mm) | 3.5 | D3 (mm) | 1.849 |
| tanθ | −0.137 | | |

In Table 2, $\tan\theta=(h1+h2-H)/Ls$.

3rd Embodiment

Figure 3A:
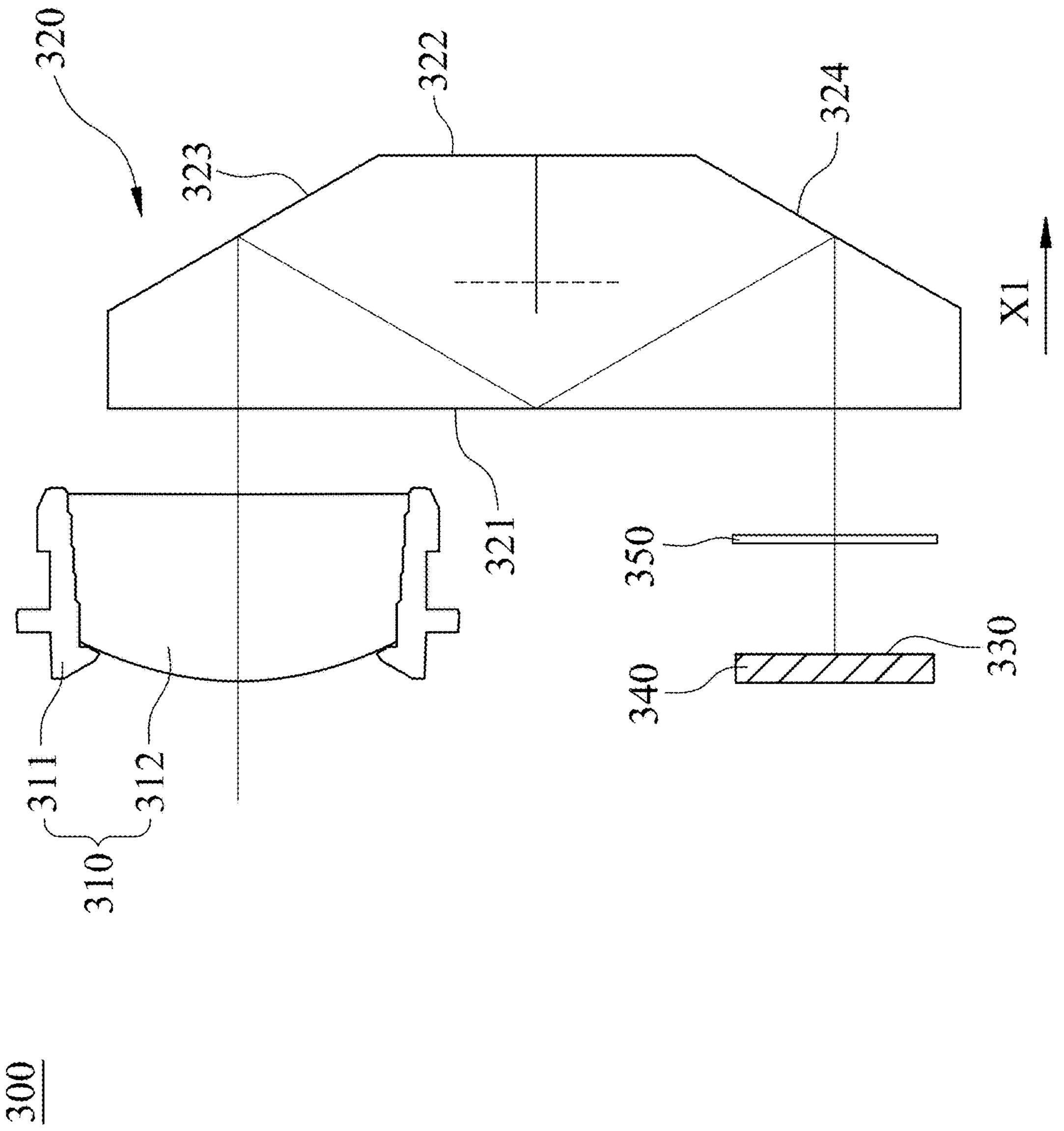
FIG. 3A is a schematic view of a camera module according to the 3rd embodiment of the present disclosure.

FIG. 3A is a schematic view of a camera module 300 according to the 3rd embodiment of the present disclosure. In FIG. 3A, the camera module 300 includes an imaging lens assembly 310, an image sensor 340 and a light path folding element 320. The image sensor 340 is disposed on an image surface 330 of the imaging lens assembly 310, the light path folding element 320 is disposed on an image side of the imaging lens assembly 310. The imaging lens assembly 310 is disposed relative to a first surface 321 of the light path folding element 320, and the light path folding element 320 is for folding an imaging light of the imaging lens assembly 310 to the image sensor 340. The imaging lens assembly 310 can include a lens barrel 311 and at least one optical element 312, wherein the optical element 312 is disposed in the lens barrel 311, and the optical element 312 can be lens elements, light blocking elements, retainers, etc., and the details will not be described herein. Further, in FIG. 3A, the camera module 300 can further include a filter 350, which is disposed between the light path folding element 320 and the image surface 330, and the present disclosure will not be limited thereto.

Figure 3B:
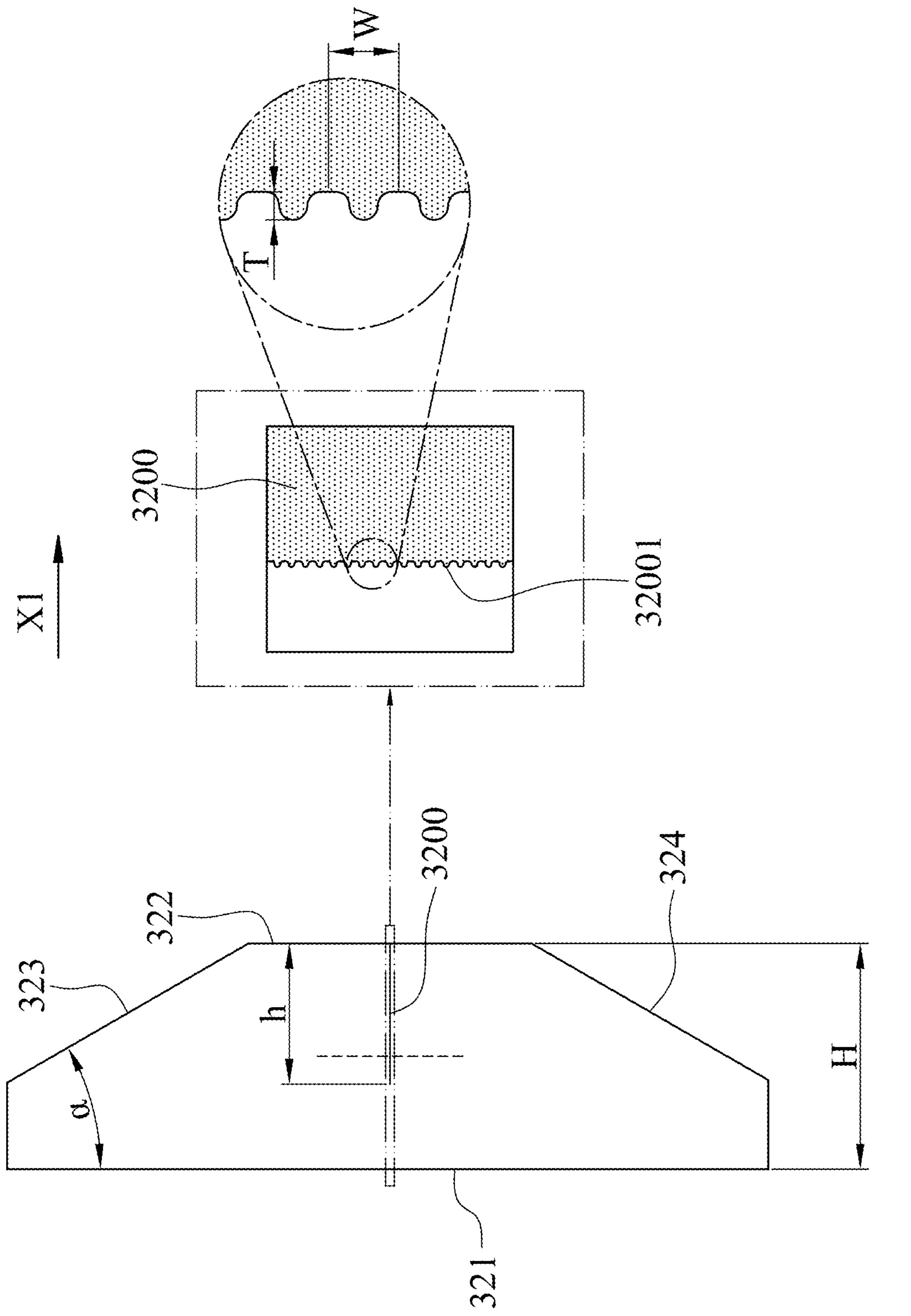
FIG. 3B is a schematic view of a light blocking structure of the light path folding element according to the 3rd embodiment of FIG. 3A.

FIG. 3B is a schematic view of a light blocking structure 3200 of the light path folding element 320 according to the 3rd embodiment of FIG. 3A. In FIG. 3A and FIG. 3B, the light path folding element 320 includes the first surface 321, a second surface 322, a first reflecting surface 323 and a second reflecting surface 324. A light travels from the first surface 321 into the light path folding element 320. The second surface 322 is disposed relative to the first surface 321 along a first direction X1 and is parallel to the first surface 321, and the first direction X1 is perpendicular to the first surface 321. The first reflecting surface 323 connects the first surface 321 and the second surface 322, an acute angle is formed between the first reflecting surface 323 and the first surface 321, and the light forms an internal reflection via the first reflecting surface 323. The light forms another internal reflection via the second reflecting surface 324. Therefore, the imaging light can travel into the image sensor 340. When a refractive index of the light path folding element 320 is N, the following condition is satisfied: $1.45<N<2.1$. According to the 3rd embodiment, the refractive index of the light path folding element 320 is 2.01, but the present disclosure will not be limited thereto.

The light path folding element 320 includes the light blocking structure 3200, the light blocking structure 3200 extends from at least one of the first surface 321 and the second surface 322 into the light path folding element 320; specifically, according to the 3rd embodiment, the light blocking structure 3200 extends from the second surface 322 into the light path folding element 320, which is a light blocking plate embedded inside the light path folding element 320, but the present disclosure will not be limited thereto.

The light blocking structure 3200 includes a plurality of convex portions 32001, and the convex portions 32001 are disposed towards the inside of the light path folding element 320.

In FIG. 3B, according to the 3rd embodiment, a spacing distance along the first direction X1 between the first surface 321 and the second surface 322 is H, a central extending depth of the light blocking structure 3200 along the first direction X1 is h, the acute angle is a, a height of each of the convex portions 32001 is T, a width of each of the convex portions 32001 is W, and the data are stated in the following Table 3.

TABLE 3

| 3rd embodiment | | | |
|---|---|---|---|
| H (mm) | 6.418 | h/H | 0.623 |
| h (mm) | 4 | α (degrees) | 30 |
| T (mm) | 0.16 | W (mm) | 0.40 |
| T/W | 0.4 | | |

4th Embodiment

Figure 4A:
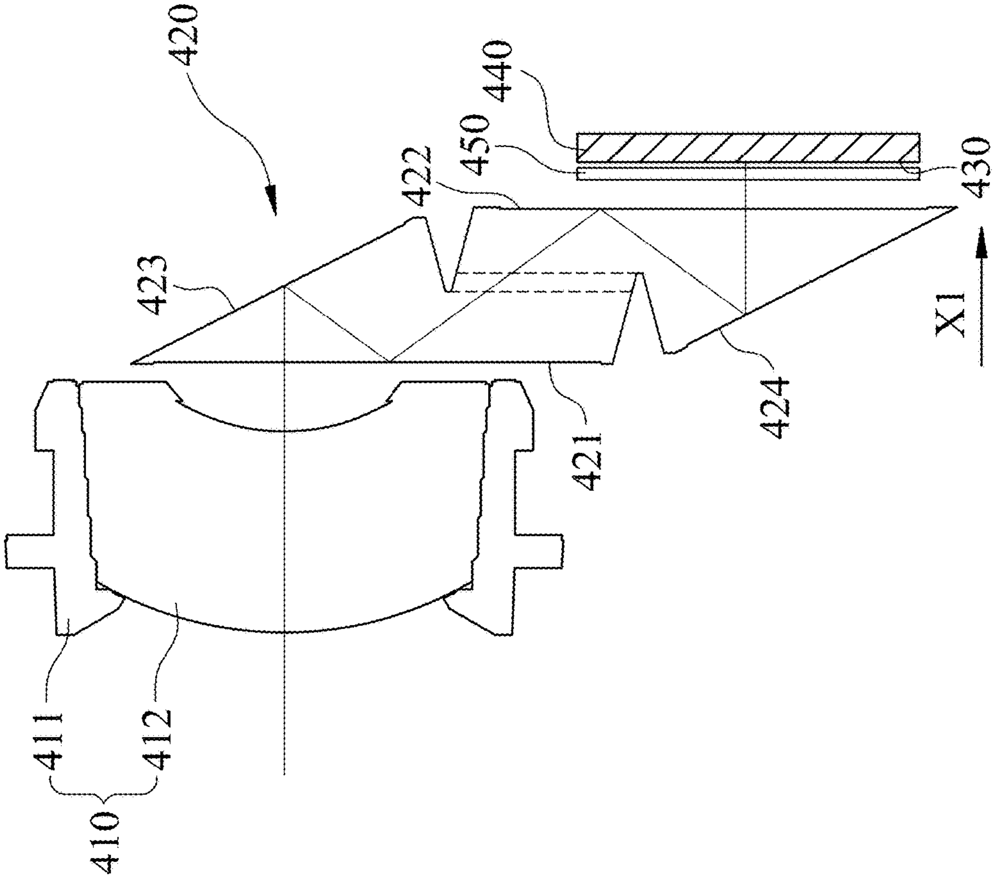
FIG. 4A is a schematic view of a camera module according to the 4th embodiment of the present disclosure.

FIG. 4A is a schematic view of a camera module 400 according to the 4th embodiment of the present disclosure. In FIG. 4A, the camera module 400 includes an imaging lens assembly 410, an image sensor 440 and a light path folding element 420. The image sensor 440 is disposed on an image surface 430 of the imaging lens assembly 410, the light path folding element 420 is disposed on an image side of the imaging lens assembly 410 and disposed between the imaging lens assembly 410 and the image sensor 440. The imaging lens assembly 410 is disposed relative to a first surface 421 of the light path folding element 420, and the light path folding element 420 is for folding an imaging light of the imaging lens assembly 410 to the image sensor 440. The imaging lens assembly 410 can include a lens barrel 411 and at least one optical element 412, wherein the optical element 412 is disposed in the lens barrel 411, and the optical element 412 can be lens elements, light blocking elements, retainers, etc., and the details will not be described herein. Further, in FIG. 4A, the camera module 400 can further include a filter 450, which is disposed between the light path folding element 420 and the image surface 430, and the present disclosure will not be limited thereto.

Figure 4B:
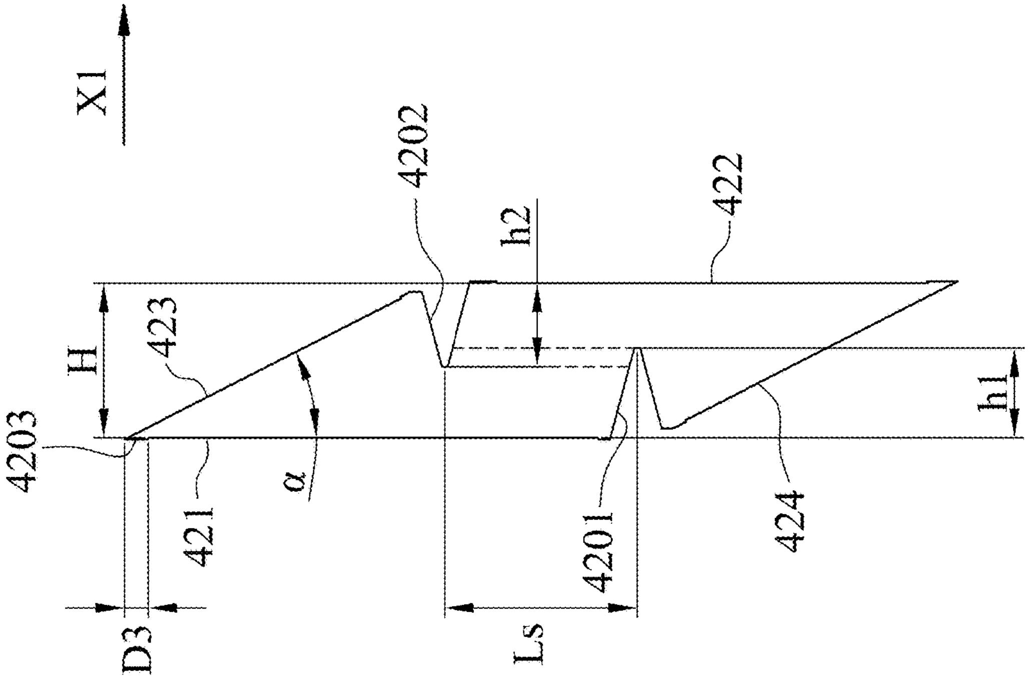
FIG. 4B is a schematic view of a first light blocking structure and a second light blocking structure of the light path folding element according to the 4th embodiment of FIG. 4A.
Figure 4C:
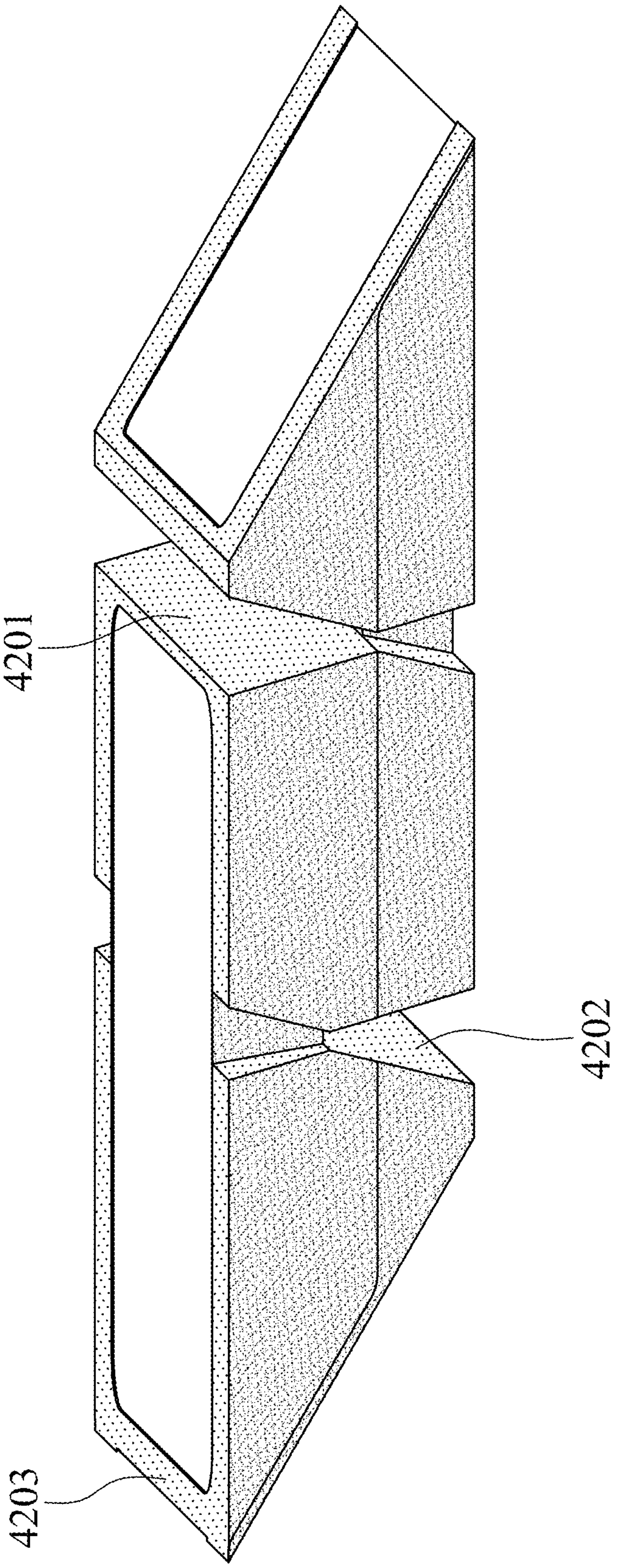
FIG. 4C is a three-dimensional schematic view of the light path folding element according to the 4th embodiment of FIG. 4A.

FIG. 4B is a schematic view of a first light blocking structure 4201 and a second light blocking structure 4202 of the light path folding element 420 according to the 4th embodiment of FIG. 4A. FIG. 4C is a three-dimensional schematic view of the light path folding element 420 according to the 4th embodiment of FIG. 4A. In FIG. 4A, FIG. 4B and FIG. 4C, the light path folding element 420 includes the first surface 421, a second surface 422, a first reflecting surface 423 and a second reflecting surface 424. A light travels from the first surface 421 into the light path folding element 420. The second surface 422 is disposed relative to the first surface 421 along a first direction X1 and is parallel to the first surface 421, and the first direction X1 is perpendicular to the first surface 421. The first reflecting surface 423 connects the first surface 421 and the second surface 422, an acute angle is formed between the first reflecting surface 423 and the first surface 421, and the light forms an internal reflection via the first reflecting surface 423. The light forms another internal reflection via the second reflecting surface 424. Therefore, the imaging light can travel into the image sensor 440. Specifically, the first reflecting surface 423 and the second reflecting surface 424 are relative to each other along a direction perpendicular to the first direction X1, and the first reflecting surface 423 and the second reflecting surface 424 are parallel to each other. When a refractive index of the light path folding element 420 is N, the following condition is satisfied: 1.45<N<2.1. According to the 4th embodiment, the refractive index of the light path folding element 420 is 1.54, but the present disclosure will not be limited thereto.

The light path folding element 420 includes two light blocking structures, which are the first light blocking structure 4201 and the second light blocking structure 4202. The first light blocking structure 4201 extends from the first surface 421 into the light path folding element 420, and the second light blocking structure 4202 extends from the second surface 422 into the light path folding element 420; that is, the first light blocking structure 4201 extends into the inside of the light path folding element 420 along the direction from the first surface 421 towards the second surface 422, the second light blocking structure 4202 extends into the inside of the light path folding element 420 along the direction from the second surface 422 towards the first surface 421. Specifically, the first light blocking structure 4201 and the second light blocking structure 4202 are shrunk from the first surface 421 and the second surface 422 into the light path folding element 420 along the first direction X1, respectively. Each of the first light blocking structure 4201 and the second light blocking structure 4202 is a light blocking coating, and the present disclosure will not be limited thereto.

Moreover, the light path folding element 420 can further include a third light blocking structure 4203. The third light blocking structure 4203 is disposed on an edge of the first surface 421, the edge is close to the first reflecting surface 423. According to the 4th embodiment, the third light blocking structure 4203 is a light blocking coating, which is disposed on the edge of the first surface 421 close to the first reflecting surface 423.

In FIG. 4B, according to the 4th embodiment, a spacing distance along the first direction X1 between the first surface 421 and the second surface 422 is H, a central extending depth of the first light blocking structure 4201 along the first direction X1 is h1, a central extending depth of the second light blocking structure 4202 along the first direction X1 is h2, a central spacing distance perpendicular to the first direction X1 between the first light blocking structure 4201 and the second light blocking structure 4202 is Ls, the acute angle is a, a distance along the first direction X1 from a center of the third light blocking structure 4203 to the edge of the first surface 421 is D3, and the data are stated in the following Table 4.

TABLE 4

| 4th embodiment | | | |
|---|---|---|---|
| H (mm) | 2.685 | h1/H | 0.581 |
| h1 (mm) | 1.56 | h2/H | 0.54 |
| h2 (mm) | 1.45 | α (degrees) | 27 |
| Ls (mm) | 3.349 | D3 (mm) | 0.413 |
| tanθ | 0.097 | | |

In Table 4, $\tan\theta=(h1+h2-H)/Ls$.

5th Embodiment

Figure 5A:
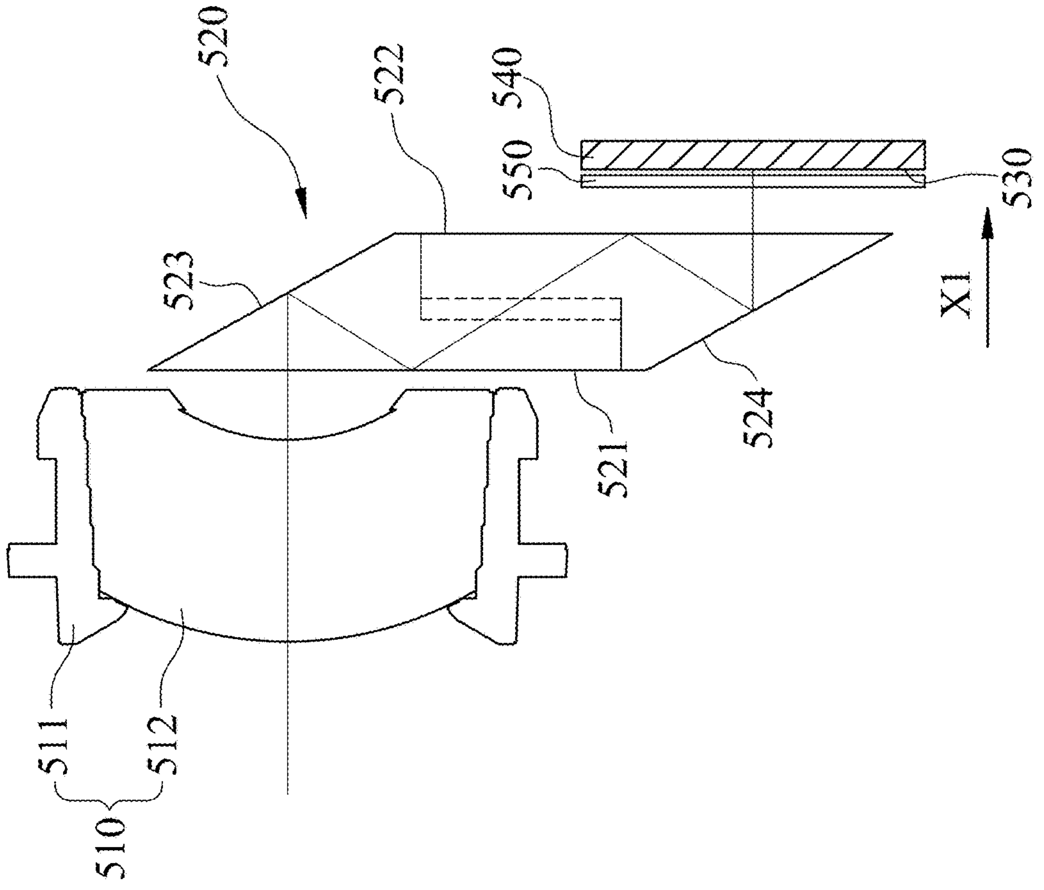
FIG. 5A is a schematic view of a camera module according to the 5th embodiment of the present disclosure.

FIG. 5A is a schematic view of a camera module 500 according to the 5th embodiment of the present disclosure.

In FIG. 5A, the camera module 500 includes an imaging lens assembly 510, an image sensor 540 and a light path folding element 520. The image sensor 540 is disposed on an image surface 530 of the imaging lens assembly 510, the light path folding element 520 is disposed on an image side of the imaging lens assembly 510, and disposed between the imaging lens assembly 510 and the image sensor 540. The imaging lens assembly 510 is disposed relative to a first surface 521 of the light path folding element 520, and the light path folding element 520 is for folding an imaging light of the imaging lens assembly 510 to the image sensor 540. The imaging lens assembly 510 can include a lens barrel 511 and at least one optical element 512, wherein the optical element 512 is disposed in the lens barrel 511, and the optical element 512 can be lens elements, light blocking elements, retainers, etc., and the details will not be described herein. Further, in FIG. 5A, the camera module 500 can further include a filter 550, which is disposed between the light path folding element 520 and the image surface 530, and the present disclosure will not be limited thereto.

Figure 5B:
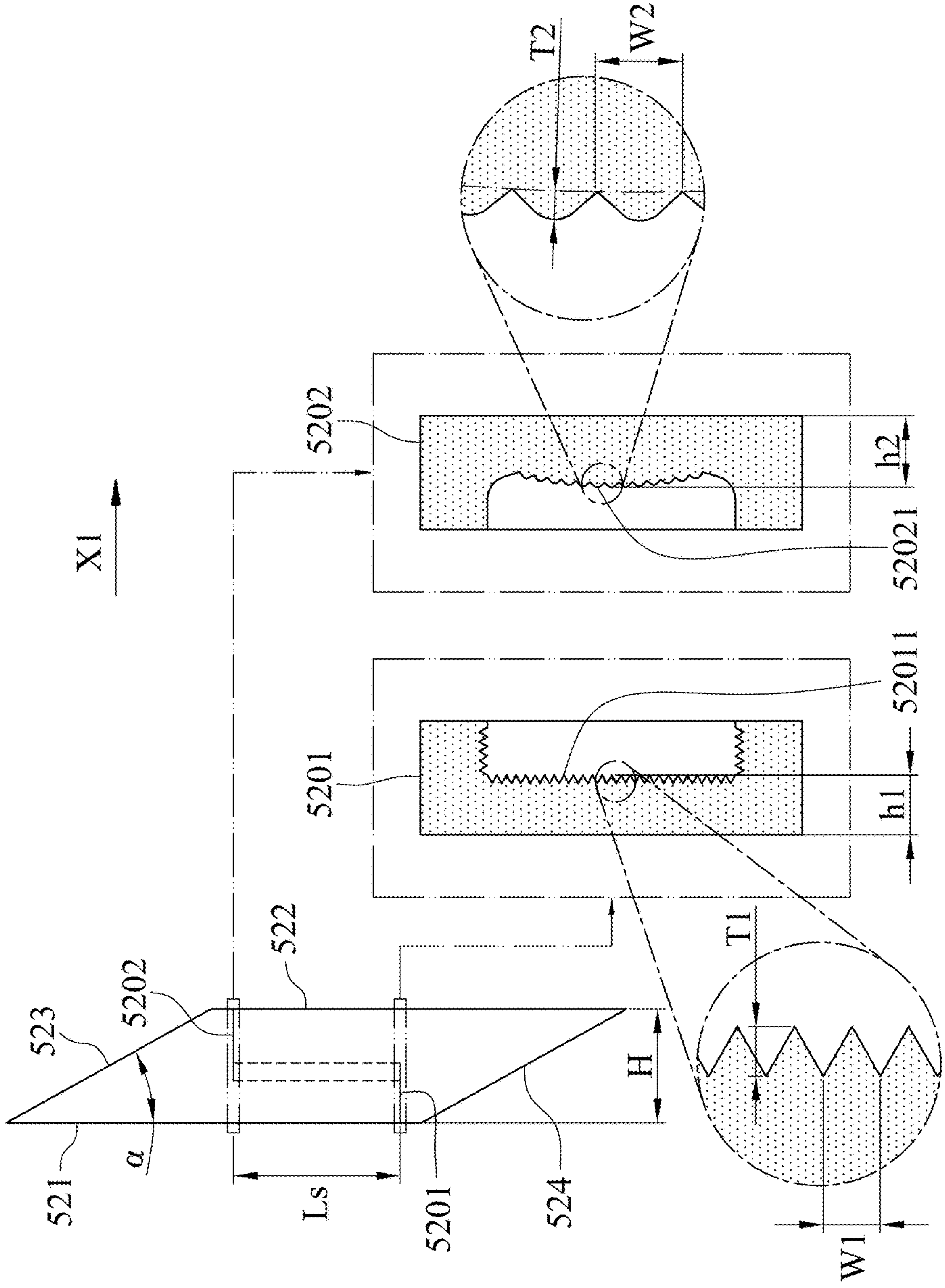
FIG. 5B is a schematic view of a first light blocking structure and a second light blocking structure of the light path folding element according to the 5th embodiment of FIG. 5A.
Figure 5C:
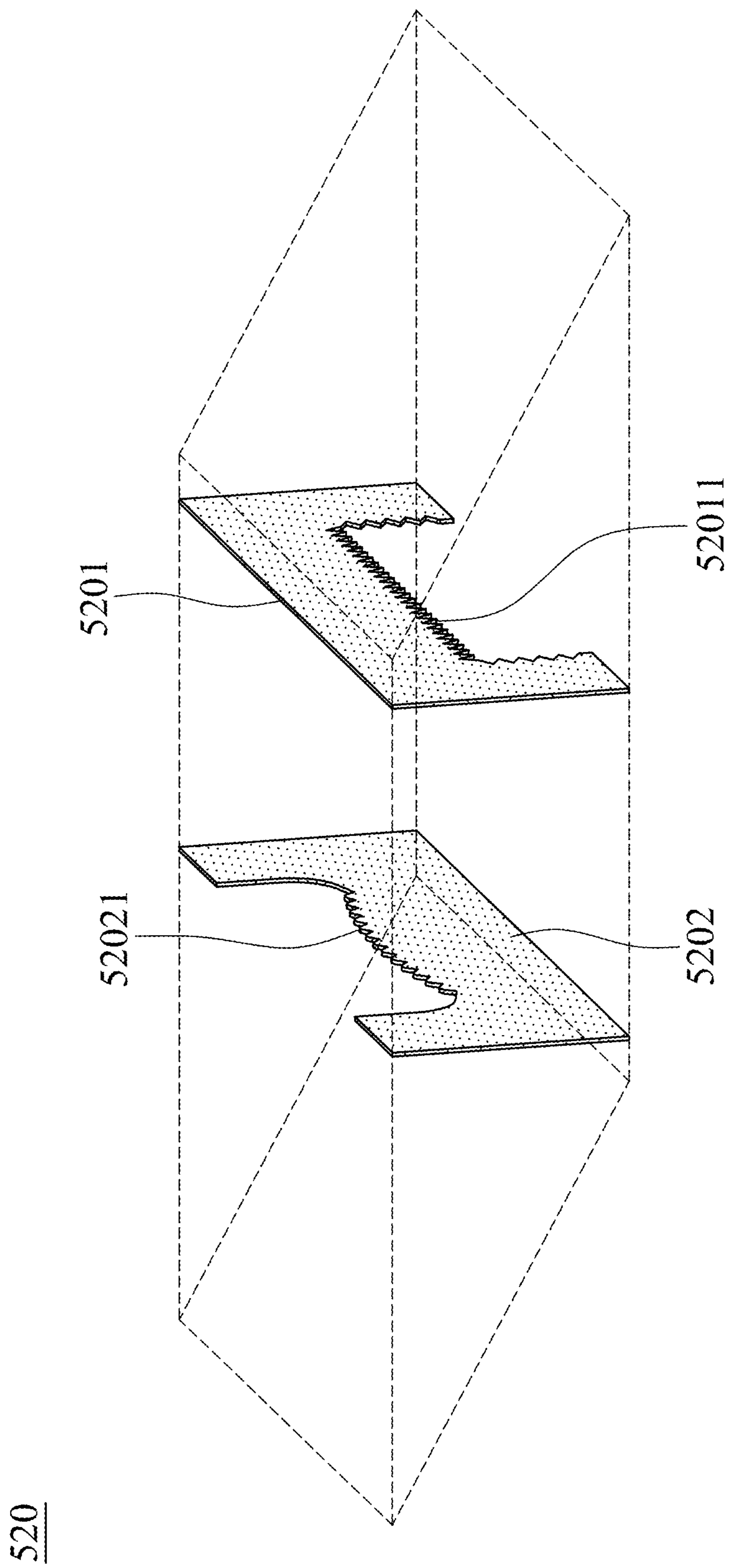
FIG. 5C is a three-dimensional schematic view of the light path folding element according to the 5th embodiment of FIG. 5A.

FIG. 5B is a schematic view of a first light blocking structure 5201 and a second light blocking structure 5202 of the light path folding element 520 according to the 5th embodiment of FIG. 5A. FIG. 5C is a three-dimensional schematic view of the light path folding element 520 according to the 5th embodiment of FIG. 5A. In FIG. 5A, FIG. 5B and FIG. 5C, the light path folding element 520 includes the first surface 521, a second surface 522, a first reflecting surface 523 and a second reflecting surface 524. A light travels from the first surface 521 into the light path folding element 520. The second surface 522 is disposed relative to the first surface 521 along a first direction X1 and is parallel to the first surface 521, and the first direction X1 is perpendicular to the first surface 521. The first reflecting surface 523 connects the first surface 521 and the second surface 522, an acute angle is formed between the first reflecting surface 523 and the first surface 521, and the light forms an internal reflection via the first reflecting surface 523. The light forms another internal reflection via the second reflecting surface 524. Therefore, the imaging light can travel into the image sensor 540. Specifically, the first reflecting surface 523 and the second reflecting surface 524 are relative to each other along a direction perpendicular to the first direction X1, and the first reflecting surface 523 and the second reflecting surface 524 are parallel to each other. When a refractive index of the light path folding element 520 is N, the following condition is satisfied: $1.45<N<2.1$. According to the 5th embodiment, the refractive index of the light path folding element 520 is 1.47, but the present disclosure will not be limited thereto.

The light path folding element 520 includes two light blocking structures, which are the first light blocking structure 5201 and the second light blocking structure 5202. The first light blocking structure 5201 extends from the first surface 521 into the light path folding element 520, and the second light blocking structure 5202 extends from the second surface 522 into the light path folding element 520; that is, the first light blocking structure 5201 extends into the inside of the light path folding element 520 along the direction from the first surface 521 towards the second surface 522, the second light blocking structure 5202 extends into the inside of the light path folding element 520 along the direction from the second surface 522 towards the first surface 521. According to the 5th embodiment, each of the first light blocking structure 5201 and the second light blocking structure 5202 is a light blocking plate embedded inside the light path folding element 520, but the present disclosure will not be limited thereto.

Each of the first light blocking structure 5201 and the second light blocking structure 5202 includes a plurality of convex portions 52011, 52021, and the convex portions 52011, 52021 are disposed towards the inside of the light path folding element 520. In detail, Each of the first light blocking structure 5201 and the second light blocking structure 5202 has a thickness, which is concave shape relative to two ends thereof, and the convex portions 52011, 52021 are disposed on the surface of the concave shape, and face towards the inside of the light path folding element 520.

In FIG. 5B, according to the 5th embodiment, a spacing distance along the first direction X1 between the first surface 521 and the second surface 522 is H, a central extending depth of the first light blocking structure 5201 along the first direction X1 is h1, a central extending depth of the second light blocking structure 5202 along the first direction X1 is h2, a central spacing distance perpendicular to the first direction X1 between the first light blocking structure 5201 and the second light blocking structure 5202 is Ls, the acute angle is α, a height of each of the convex portions 52011 is T1, a height of each of the convex portions 52021 is T2, a width of each of the convex portions 52011 is W1, a width of each of the convex portions 52021 is W2, and the data are stated in the following Table 5.

TABLE 5

| 5th embodiment | | | |
|---|---|---|---|
| H (mm) | 2.385 | tanθ | 0.104 |
| h1 (mm) | 1.25 | h1/H | 0.524 |
| h2 (mm) | 1.5 | h2/H | 0.629 |
| Ls (mm) | 3.5 | α (degrees) | 29 |
| T1 (mm) | 0.173 | W1 (mm) | 0.2 |
| T1/W1 | 0.865 | T2 (mm) | 0.101 |
| W2 (mm) | 0.298 | T2/W2 | 0.339 |

In Table 5, $\tan\theta=(h1+h2-H)/Ls$.

6th Embodiment

Figure 6A:
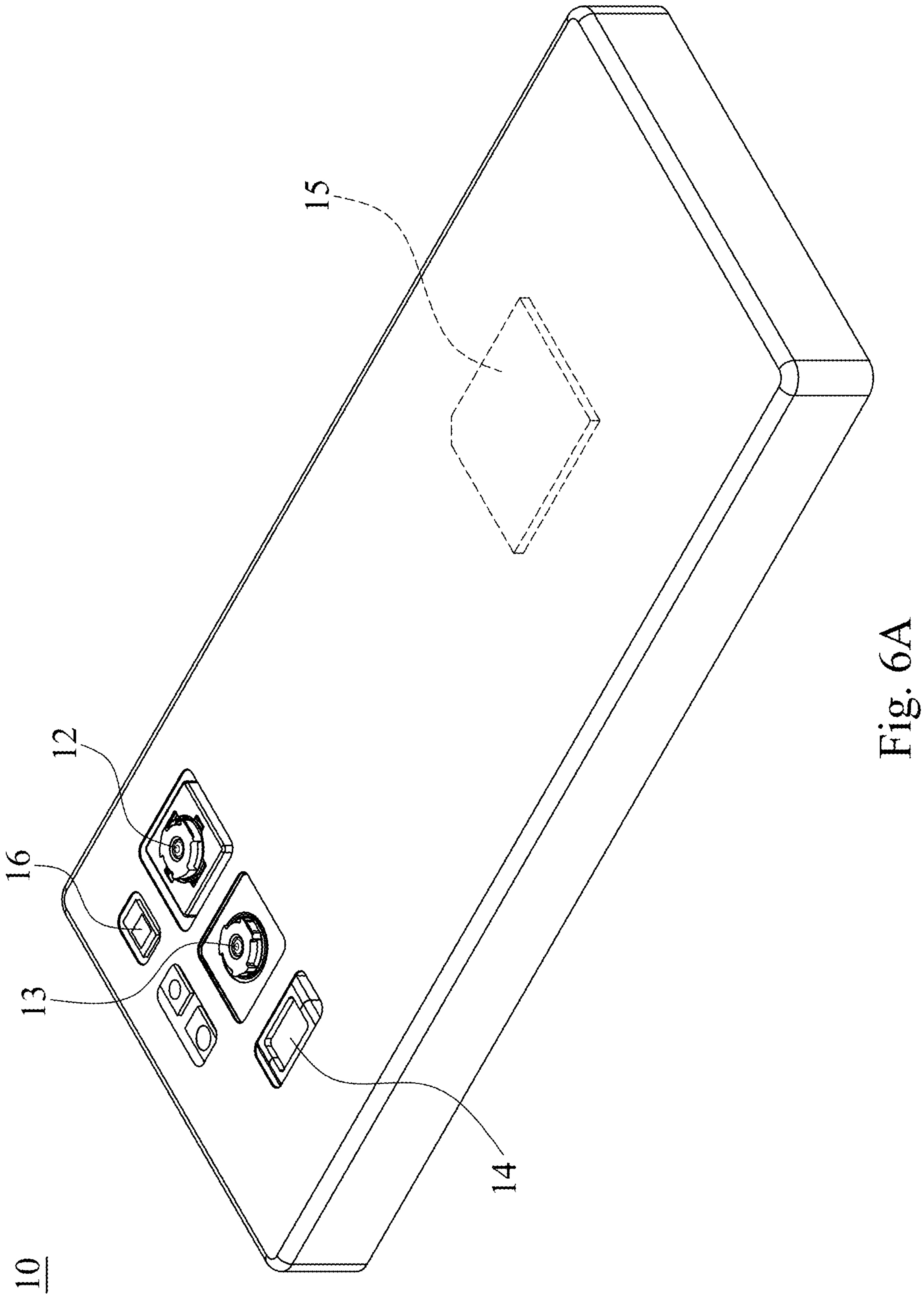
FIG. 6A is a schematic view of an electronic device according to the 6th embodiment of the present disclosure.
Figure 6B:
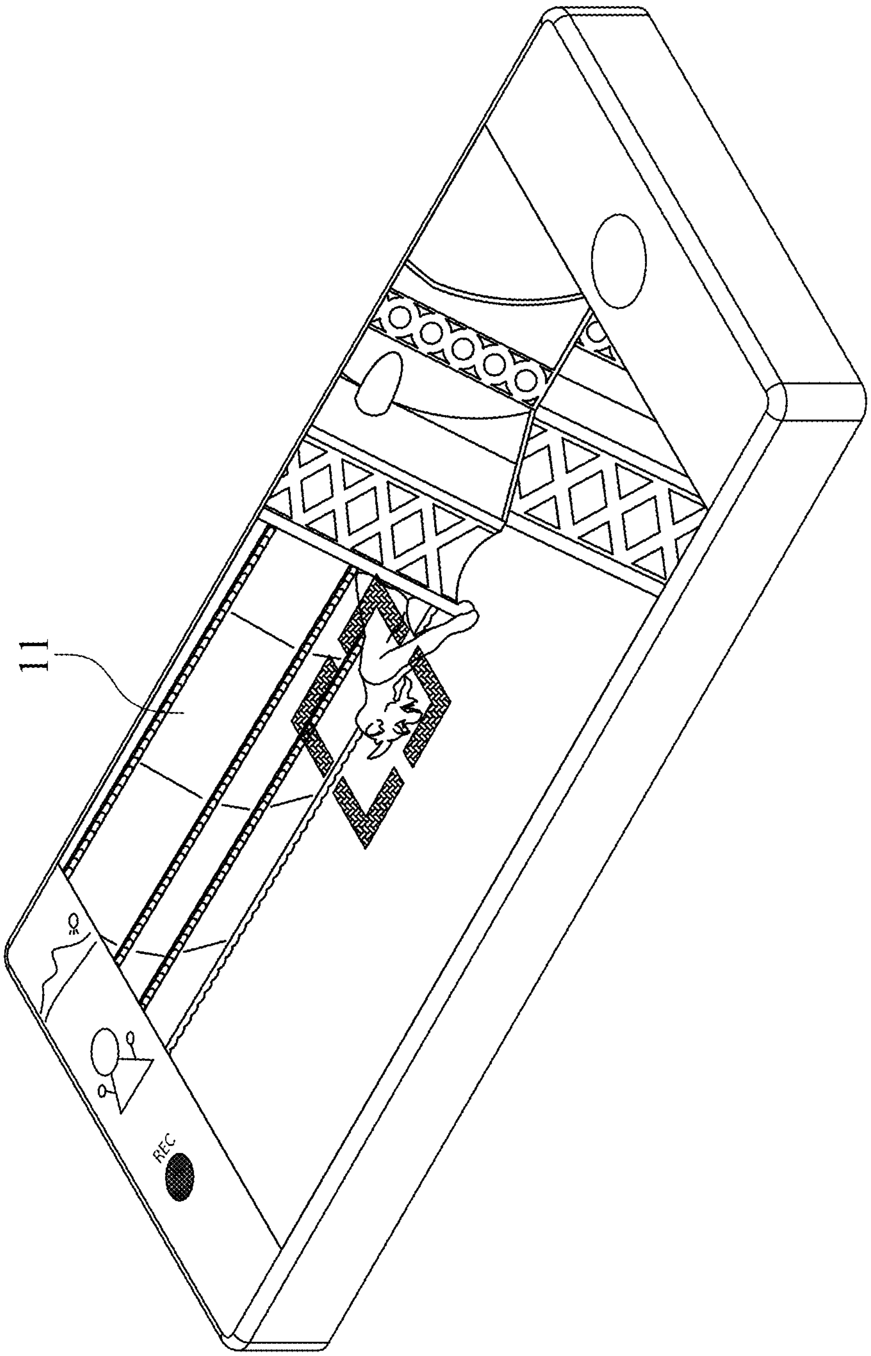
FIG. 6B is another schematic view of the electronic device according to the 6th embodiment of FIG. 6A.

FIG. 6A is a schematic view of an electronic device 10 according to the 6th embodiment of the present disclosure. FIG. 6B is another schematic view of the electronic device 10 according to the 6th embodiment of FIG. 6A. As shown in FIG. 6A and FIG. 6B, the electronic device 10 is a smartphone. The electronic device 10 includes a plurality of camera modules and a user interface 11. Further, the camera modules are an ultra-wide-angle camera module 12, a high-pixel camera module 13 and a telephoto camera module 14, and the user interface 11 is a touch screen, but the present disclosure is not limited thereto. Specifically, each of the camera modules can be any one camera module of the 1st embodiment to the 5th embodiment, but the present disclosure will not be limited thereto.

A user enters a shooting mode via the user interface 11. The user interface 11 is used to display the screen, and the shooting angle can be manually adjusted to switch between different camera modules. At this moment, the camera modules collect an imaging light on the respective image sensor and output electronic signals associated with images to an image signal processor (ISP) 15.

As shown in FIG. 6B, according to the camera specifications of the electronic device 10, the electronic device 10 can further include an optical anti-shake mechanism (figure is omitted). Further, the electronic device 10 can further include at least one focusing assisting module (figure is omitted) and at least one sensing component (figure is omitted). The focusing assisting module can be a flash module 16, an infrared distance measurement component, a laser focus module, etc. The flash module 16 is for compensating the color temperature. The sensing component can have functions for sensing physical momentum and kinetic energies, such as an accelerator, a gyroscope, and a Hall effect element, so as to sense shaking or jitters applied by hands of the user or external environments. Thus the autofocus function and the optical anti-shake mechanism of the imaging lens assembly disposed on the electronic device 10 can function to obtain a great image quality and facilitate the electronic device 10 according to the present disclosure to have a capturing function with multiple modes, such as taking optimized selfies, high dynamic range (HDR) with a low light source, 4K resolution recording, etc. Furthermore, the user can visually see the captured image of the camera through the user interface 11 and manually operate the view finding range on the user interface 11 to achieve the auto focus function of what you see is what you get.

Furthermore, the camera modules, the optical anti-shake mechanism, the sensing component and the focusing assisting module can be disposed on a flexible printed circuit board (FPC) (figure is omitted) and electrically connected to the image signal processor 15 and so on via a connector (figure is omitted) so as to operate a picturing process. Recent electronic devices such as smartphones have a trend towards thinness and lightness. The imaging lens assembly and the related elements are disposed on a FPC and circuits are assembled into a main board of an electronic device by a connector. Hence, it can fulfill a mechanical design of a limited inner space of the electronic device and a requirement of a circuit layout and obtain a larger allowance, and it is also favorable for an autofocus function of the imaging lens assembly obtaining a flexible control via a touch screen of the electronic device. In the 6th embodiment, the electronic device 10 can include a plurality of the sensing components and a plurality of the focusing assisting modules, and the sensing components and the focusing assisting modules are disposed on an FPC and another at least one FPC (figure is omitted) and electrically connected to the image signal processor 15 and so on via a corresponding connector so as to operate a picturing process. In other embodiments (figure is omitted), the sensing components and auxiliary optical elements can be disposed on a main board of an electronic device or a board of the other form according to a mechanical design and a requirement of a circuit layout.

Furthermore, the electronic device 10 can further include, but not be limited to, a display, a control unit, a storage unit, a random-access memory (RAM), a read-only memory (ROM), or the combination thereof.

Figure 6C:
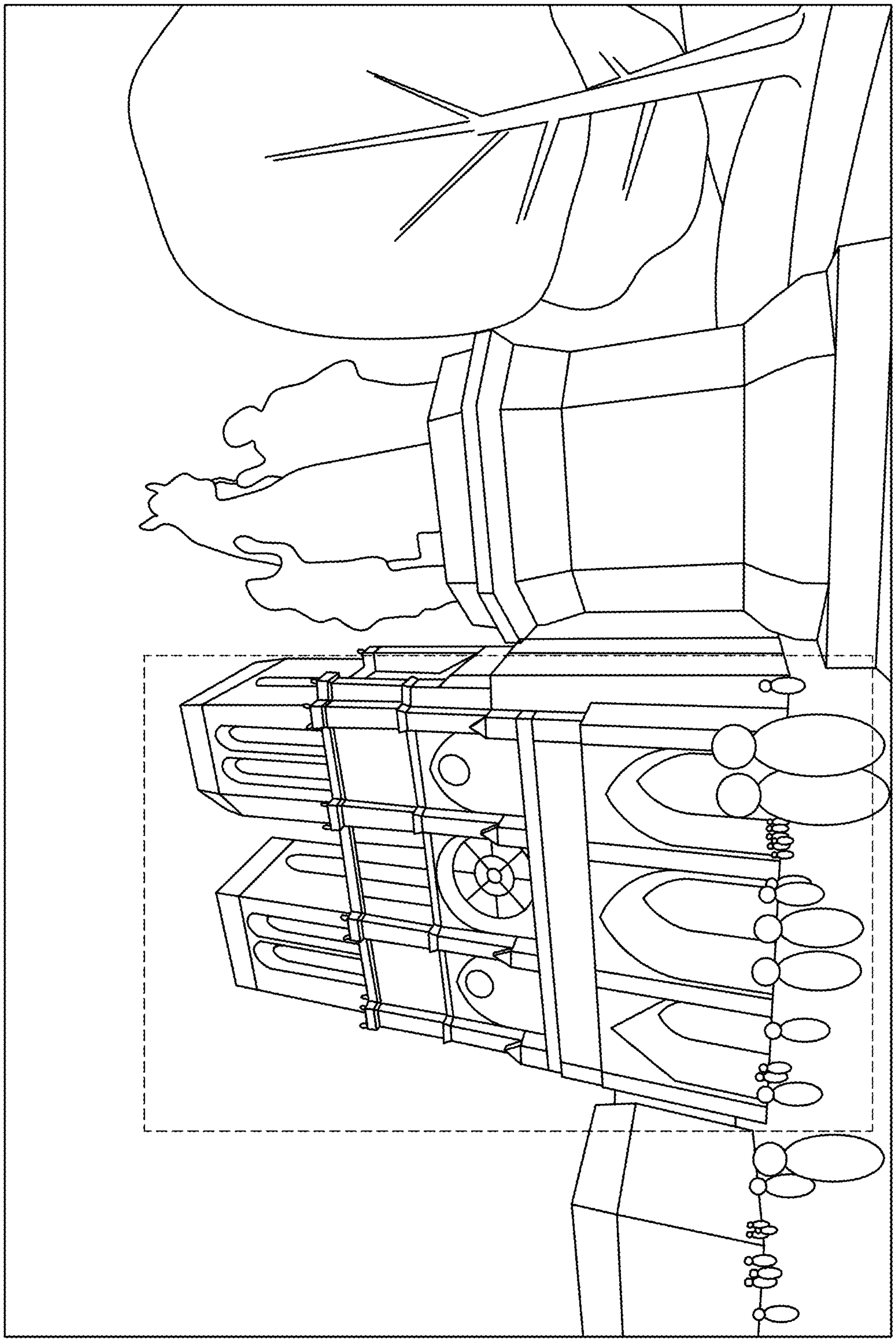
FIG. 6C is a schematic view of an image captured via the electronic device according to the 6th embodiment of FIG. 6A.

FIG. 6C is a schematic view of an image captured via the electronic device 10 according to the 6th embodiment of FIG. 6A. As shown in FIG. 6C, a larger ranged image can be captured via the ultra-wide-angle camera module 12, which has a function for containing more views.

Figure 6D:
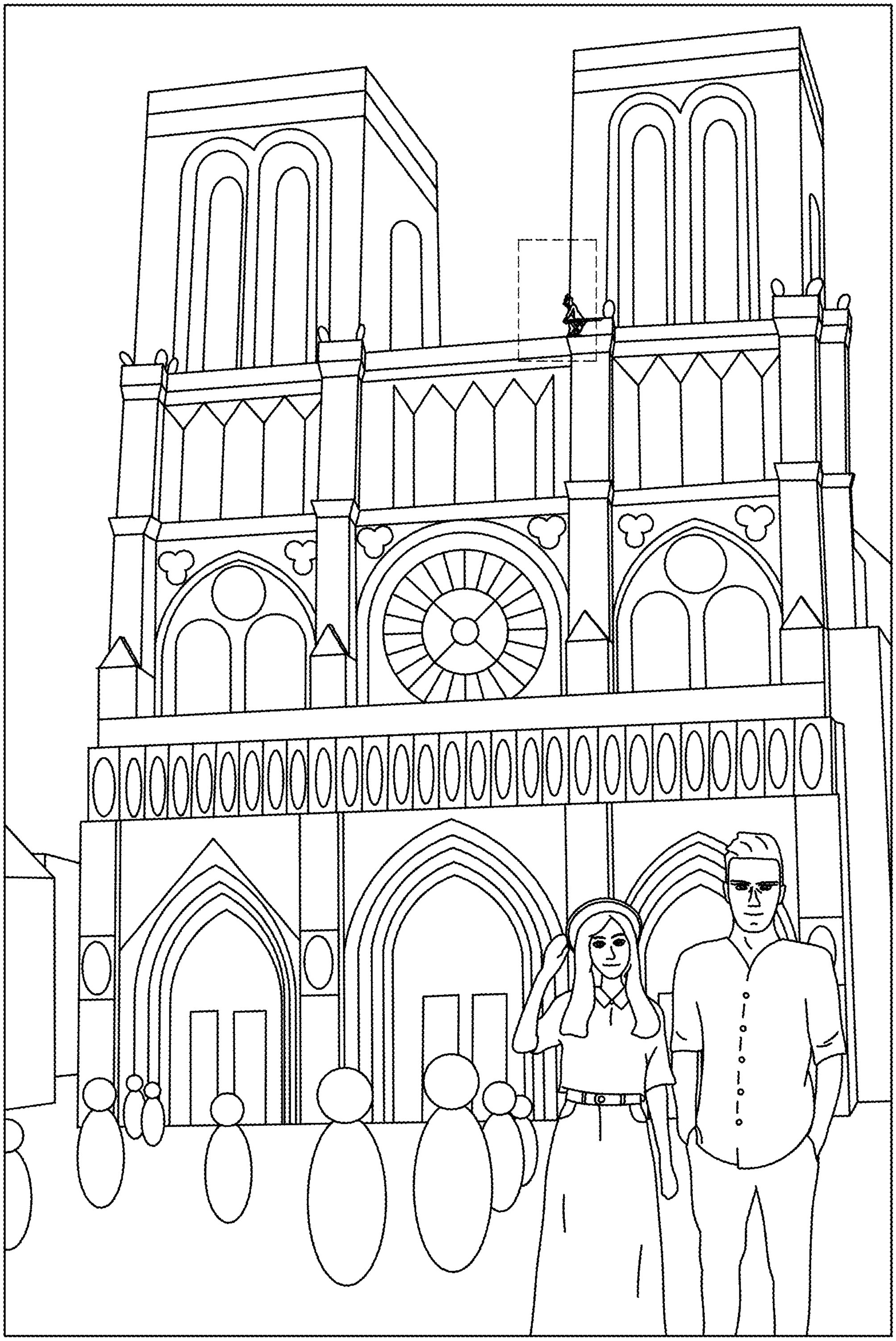
FIG. 6D is another schematic view of the image captured via the electronic device according to the 6th embodiment of FIG. 6A.

FIG. 6D is another schematic view of the image captured via the electronic device 10 according to the 6th embodiment of FIG. 6A. As shown in FIG. 6D, a certain ranged and high-pixel image can be captured via the high-pixel camera module 13, which has a function for high resolution and low distortion.

Figure 6E:
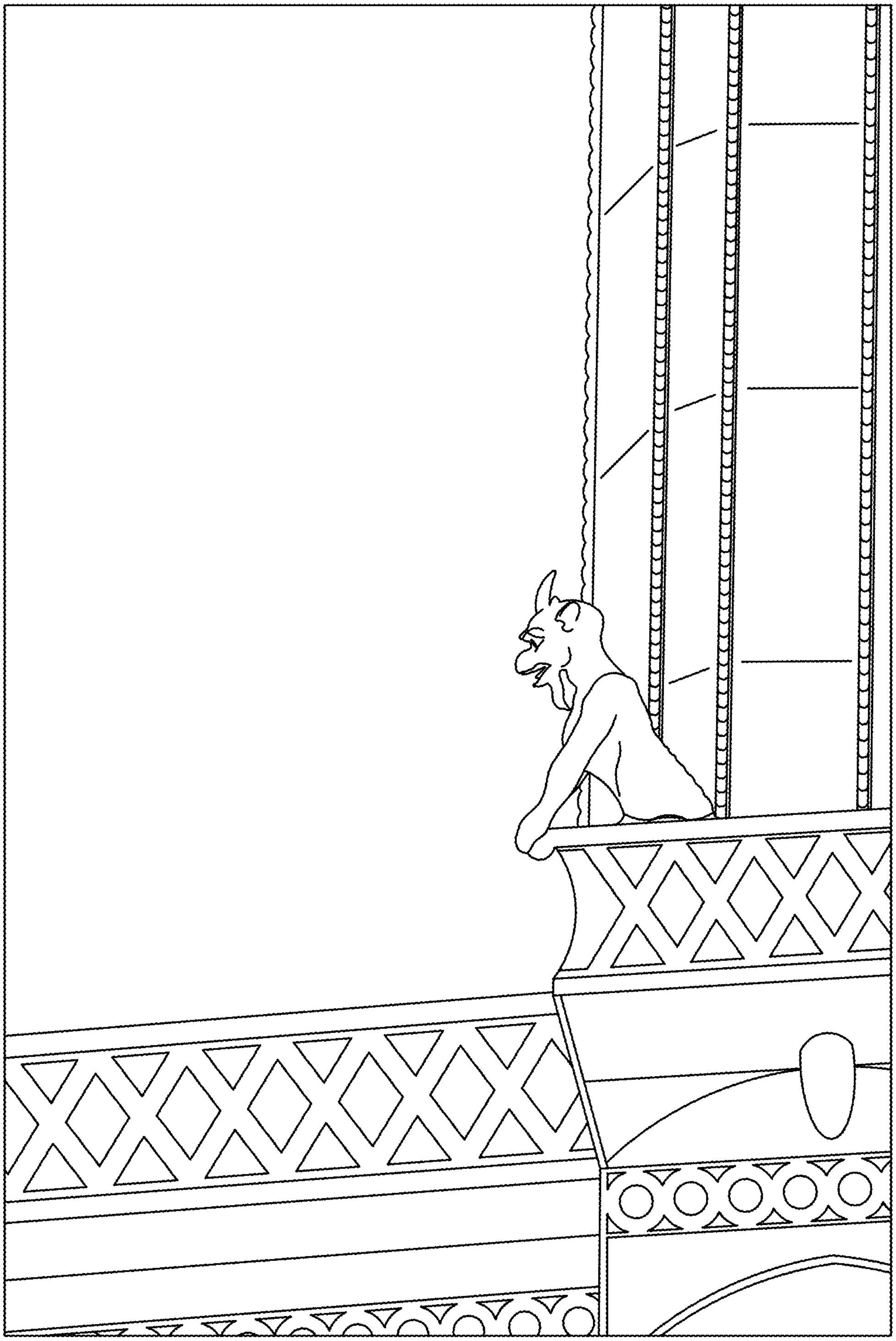
FIG. 6E is the other schematic view of the image captured via the electronic device according to the 6th embodiment of FIG. 6A.

FIG. 6E is the other schematic view of the image captured via the electronic device 10 according to the 6th embodiment of FIG. 6A. As shown in FIG. 6E, a far image can be captured and enlarged to a high magnification via the telephoto camera module 14, which has a function for a high magnification.

As shown in FIG. 6C to FIG. 6E, when an image is captured via different camera modules having various focal lengths and processed via a technology of an image processing, a zoom function of the electronic device 10 can be achieved.

7th Embodiment

Figure 7:
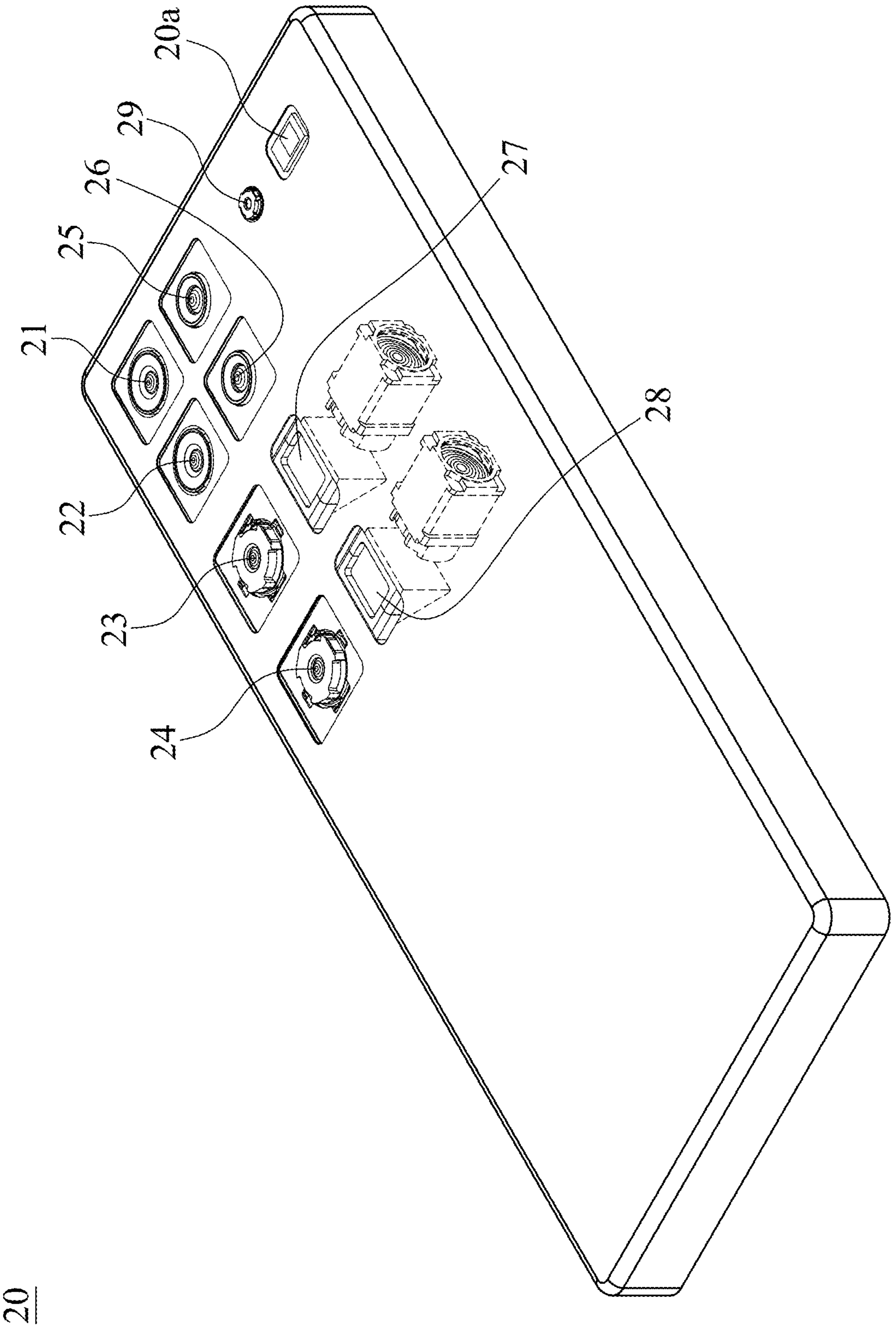
FIG. 7 is a schematic view of an electronic device according to the 7th embodiment of the present disclosure.

FIG. 7 is a schematic view of an electronic device 20 according to the 7th embodiment of the present disclosure. As shown in FIG. 7, the electronic device 20 is a smartphone. The electronic device 20 includes a plurality of camera modules. Further, the camera modules are two ultra-wide-angle camera modules 21, 22, two wide angle camera modules 23, 24, four telephoto camera modules 25, 26, 27, 28 and a Time-Of-Flight (TOF) module 29, wherein the Time-Of-Flight (TOF) module 29 can be other types of camera module, which will not be limited to the present arrangement. Specifically, each of the camera modules can be any one camera module of the 1st embodiment to the 5th embodiment, but the present disclosure will not be limited thereto.

Moreover, the telephoto camera modules 27, 28 are configured to fold the light, but the present disclosure will not be limited thereto.

According to the camera specifications of the electronic device 20, the electronic device 20 can further include an optical anti-shake mechanism (figure is omitted). Further, the electronic device 20 can further include at least one focusing assisting module (figure is omitted) and at least one sensing component (figure is omitted). The focusing assisting module can be a flash module 20*a*, an infrared distance measurement component, a laser focus module, etc. The flash module 20*a* is for compensating the color temperature. The sensing component can have functions for sensing physical momentum and kinetic energies, such as an accelerator, a gyroscope, and a Hall effect element, so as to sense shaking or jitters applied by hands of the user or external environments. Thus, the autofocus function and the optical anti-shake mechanism of the camera module disposed on the electronic device 20 can function to obtain a great image quality and facilitate the electronic device 20 according to the present disclosure to have a capturing function with multiple modes, such as taking optimized selfies, high dynamic range (HDR) with a low light source, 4K resolution recording, etc.

Further, all of other structures and dispositions according to the 7th embodiment are the same as the structures and the dispositions according to the 6th embodiment, and will not be described again herein.

8th Embodiment

Figure 8A:
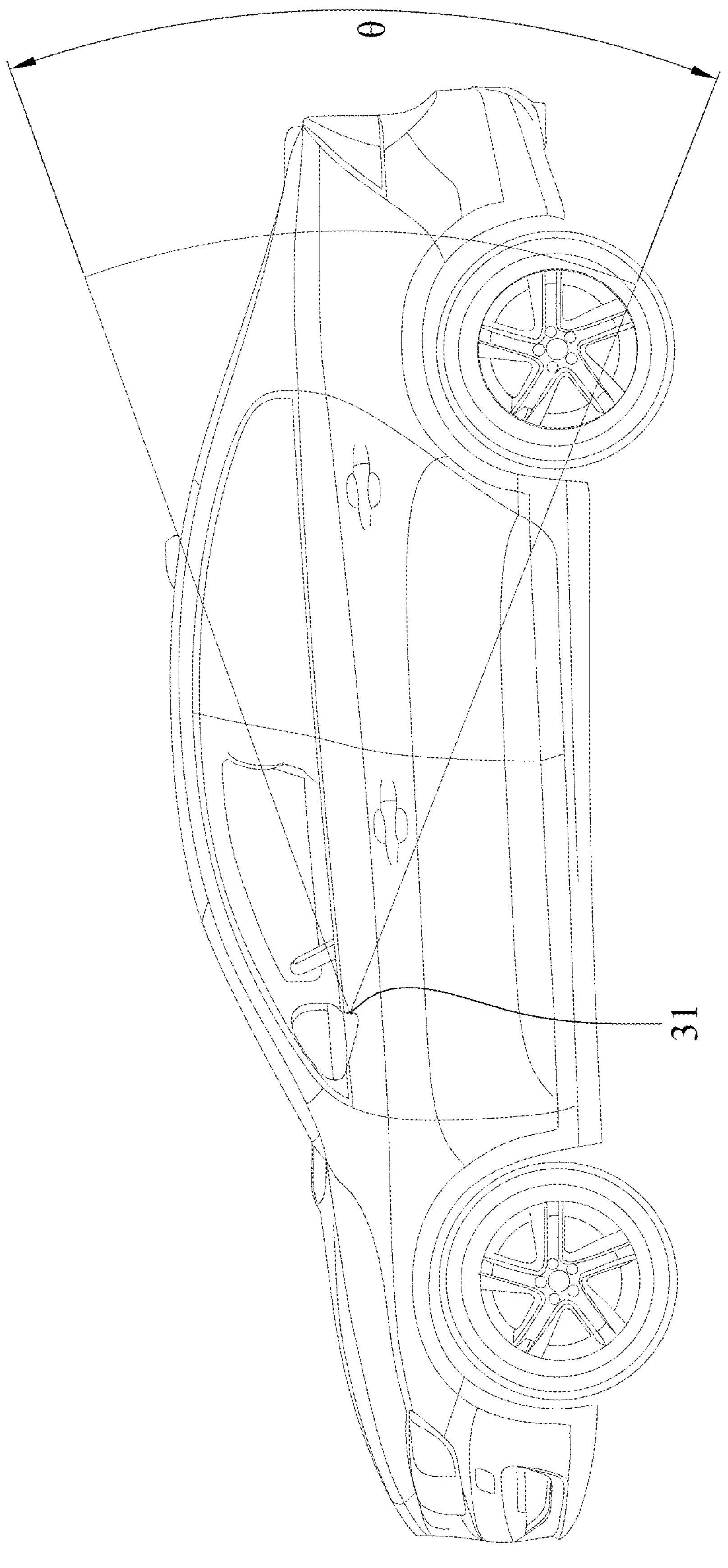
FIG. 8A is a schematic view of a vehicle instrument according to the 8th embodiment of the present disclosure.
Figure 8B:
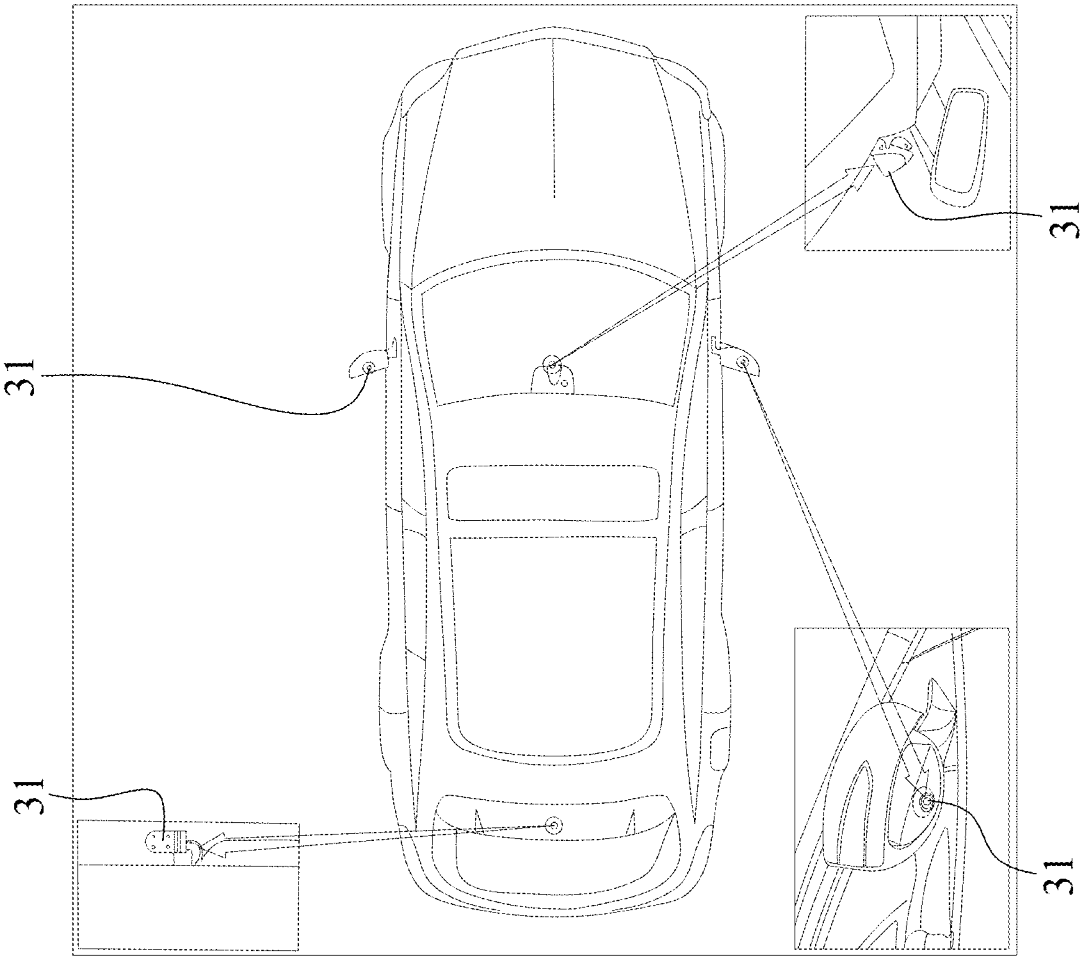
FIG. 8B is another schematic view of the vehicle instrument according to the 8th embodiment in FIG. 8A.
Figure 8C:
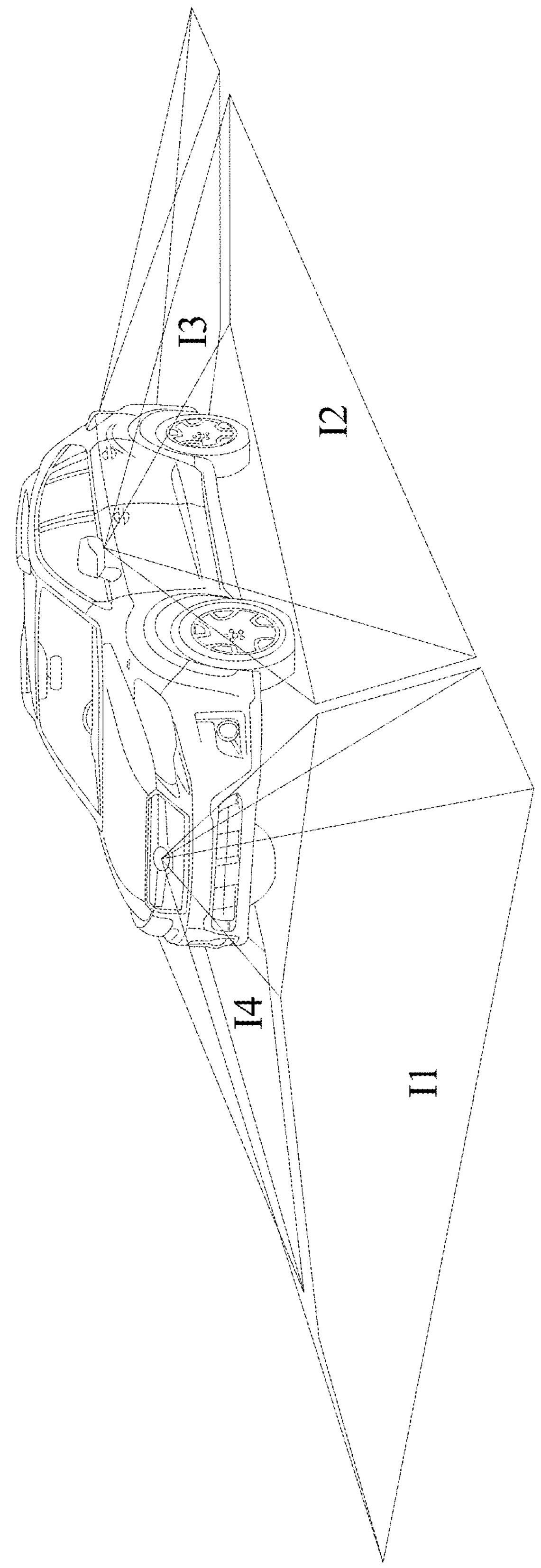
FIG. 8C is another schematic view of the vehicle instrument according to the 8th embodiment in FIG. 8A.

FIG. 8A is a schematic view of a vehicle instrument 30 according to the 8th embodiment of the present disclosure. FIG. 8B is another schematic view of the vehicle instrument 30 according to the 8th embodiment in FIG. 8A. FIG. 8C is another schematic view of the vehicle instrument 30 according to the 8th embodiment in FIG. 8A. In FIGS. 8A to 8C, the vehicle instrument 30 includes a plurality of camera modules 31. According to the 8th embodiment, a number of the camera modules 31 is six, and the camera modules 31 can be the camera module according to any one of the aforementioned 1st embodiment to 5th embodiment, but the present disclosure is not limited thereto.

In FIGS. 8A and 8B, the camera modules 31 are automotive camera modules, two of the camera modules 31 are located under rearview mirrors on a left side and a right side, respectively, and the aforementioned camera modules 31 are configured to capture the image information of a visual angle θ. In particular, the visual angle θ can satisfy the following condition: 40 degrees<θ<90 degrees. Therefore, the image information in the regions of two lanes on the left side and the right side can be captured.

In FIG. 8B, another two of the camera modules 31 can be disposed in the inner space of the vehicle instrument 30. In particular, the aforementioned two camera modules 31 are disposed on a location close to the rearview mirror inside the vehicle instrument 30 and a location close to the rear car window, respectively. Moreover, the camera modules 31 can be further disposed on the rearview mirrors of the vehicle instrument 30 on the left side and the right side except the mirror surface, respectively, but the present disclosure is not limited thereto.

In FIG. 8C, another two of the camera modules 31 can be disposed on a front end of the vehicle instrument 30 and a rear end of the vehicle instrument 30, respectively. By disposing the camera modules 31 on the front end and the rear end of the vehicle instrument 30 and under the rearview mirror on the left side of the vehicle instrument 30 and the right side of the vehicle instrument 30, it is favorable for the drivers obtaining the external space information in addition to the driving seat, such as the external space informations 11, 12, 13, 14, but the present disclosure is not limited thereto. Therefore, more visual angles can be provided to reduce the blind spot, so that the driving safety can be improved. Further, the traffic information outside of the vehicle instrument 30 can be recognized by disposing the camera modules 31 on the periphery of the vehicle instrument 30, so that the function of the automatic driving assistance can be achieved.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. A light path folding element, comprising:

a first surface, a light traveling from the first surface into the light path folding element;

a second surface disposed relative to the first surface along a first direction and being parallel to the first surface, and the first direction being perpendicular to the first surface;

a first reflecting surface disposed between the first surface and the second surface, and the light forming an internal reflection via the first reflecting surface; and a second reflecting surface, the light forming another internal reflection via the second reflecting surface;

wherein the light path folding element further comprises a first light blocking structure and a second light blocking structure, the first light blocking structure extends towards the second surface, and the second light blocking structure extends towards the first surface;

wherein a spacing distance along the first direction between the first surface and the second surface is H, a central extending depth of the first light blocking structure along the first direction is h1, a central extending depth of the second light blocking structure along the first direction is h2, a central spacing distance perpendicular to the first direction between the first light blocking structure and the second light blocking structure is Ls, and the following condition is satisfied:

$$0 \le \tan\theta \le 0.45, \text{ wherein } \tan\theta = (h1 + h2 - H)/Ls.$$

2. The light path folding element of claim 1, wherein an acute angle is formed between the first reflecting surface and the first surface, the acute angle is α, and the following condition is satisfied:

$$15 \text{ degrees} < \alpha < 37 \text{ degrees}.$$

3. The light path folding element of claim 1, wherein the first reflecting surface and the second reflecting surface are relative to each other along a direction perpendicular to the first direction, and the first reflecting surface and the second reflecting surface are parallel to each other.

4. The light path folding element of claim 1, wherein the first light blocking structure and the second light blocking structure are shrunk from the first surface and the second surface into the light path folding element along the first direction, respectively.

5. The light path folding element of claim 1, wherein a refractive index of the light path folding element is N, and the following condition is satisfied:

$$1.45 < N < 2.1.$$

6. The light path folding element of claim 1, further comprising:

a third light blocking structure disposed on an edge of the first surface, the edge being close to the first reflecting surface.

7. The light path folding element of claim 1, wherein at least one of the first light blocking structure and the second light blocking structure comprises a plurality of convex portions, and the convex portions are disposed towards an inside of the light path folding element.

8. A light path folding element, comprising:

a first surface, a light traveling into and out of the light path folding element via the first surface;

a second surface disposed relative to the first surface along a first direction and being parallel to the first surface, and the first direction being perpendicular to the first surface;

a first reflecting surface disposed between the first surface and the second surface, and the light forming an internal reflection via the first reflecting surface; and a second reflecting surface, the light forming another internal reflection via the second reflecting surface;

wherein the light path folding element further comprises a light blocking structure, the light blocking structure extends towards at least one of the first surface and the second surface;

wherein a spacing distance along the first direction between the first surface and the second surface is H, a central extending depth of the light blocking structure along the first direction is h, and the following condition is satisfied:

$$0.45 \leq h/H \leq 0.80.$$

9. The light path folding element of claim 8, wherein the spacing distance along the first direction between the first surface and the second surface is H, the central extending depth of the light blocking structure along the first direction is h, and the following condition is satisfied:

$$0.57 \leq h/H \leq 0.75.$$

10. The light path folding element of claim 8, wherein an acute angle is formed between the first reflecting surface and the first surface, the acute angle is α, and the following condition is satisfied:

$$15 \text{ degrees} < \alpha < 37 \text{ degrees}.$$

11. The light path folding element of claim 10, wherein another acute angle is formed between the second reflecting surface and the first surface.

12. The light path folding element of claim 8, wherein a refractive index of the light path folding element is N, and the following condition is satisfied:

$$1.45 < N \leq 1.78.$$

13. The light path folding element of claim 8, wherein the light blocking structure comprises a plurality of convex portions, and the convex portions are disposed towards an inside of the light path folding element.

14. The light path folding element of claim 8, wherein the light blocking structure is shrunk from at least one of the first surface and the second surface into the light path folding element along the first direction.

15. A light path folding element, comprising:

a first surface, a light traveling from the first surface into the light path folding element;

a second surface disposed relative to the first surface along a first direction, and the first direction being perpendicular to the first surface;

a first reflecting surface disposed between the first surface and the second surface, and the light forming an internal reflection via the first reflecting surface; and a second reflecting surface, the light forming another internal reflection via the second reflecting surface;

wherein the light path folding element further comprises a light blocking structure, the light blocking structure extends towards at least one of the first surface and the second surface;

wherein the light blocking structure comprises a plurality of convex portions, and the convex portions are disposed towards an inside of the light path folding element, a height of each of the convex portions is T, a width of each of the convex portions is W, and the following condition is satisfied:

$$0.1 < T/W < 3.5.$$

16. The light path folding element of claim 15, wherein a spacing distance along the first direction between the first surface and the second surface is H, a central extending depth of the light blocking structure along the first direction is h, and the following condition is satisfied:

$$0.45 \leq h/H \leq 0.80.$$

17. The light path folding element of claim 15, wherein a refractive index of the light path folding element is N, and the following condition is satisfied:

$$145 < N \leq 1.78.$$

18. The light path folding element of claim 15, wherein an acute angle is formed between the first reflecting surface and the first surface, the acute angle is α, and the following condition is satisfied:

$$15 \text{ degrees} < \alpha < 37 \text{ degrees}.$$

19. The light path folding element of claim 15, wherein the height of each of the convex portions is T, the width of each of the convex portions is W, and the following condition is satisfied:

$$0.2 < T/W < 2.2.$$

20. The light path folding element of claim 19, wherein the height of each of the convex portions is T, the width of each of the convex portions is W, and the following condition is satisfied:

$$0.25 < T/W < 1.05.$$

21. The light path folding element of claim 15, wherein the light blocking structure is shrunk from at least one of the first surface and the second surface into the light path folding element along the first direction.

22. The light path folding element of claim 15, further comprising:

a third light blocking structure disposed on an edge of the first surface, the edge being close to the first reflecting surface.

23. A camera module, comprising:

an imaging lens assembly;

an image sensor; and the light path folding element of claim 15, wherein the imaging lens assembly is disposed relative to the first surface of the light path folding element, and the light path folding element is for folding an imaging light of the imaging lens assembly to the image sensor.

24. An electronic device, comprising:

the camera module of claim 23.

* * * * *